(12) United States Patent
Marrion, Jr. et al.

(10) Patent No.: US 8,326,084 B1
(45) Date of Patent: Dec. 4, 2012

(54) SYSTEM AND METHOD OF AUTO-EXPOSURE CONTROL FOR IMAGE ACQUISITION HARDWARE USING THREE DIMENSIONAL INFORMATION

(75) Inventors: Cyril C. Marrion, Jr., Acton, MA (US); Sanjay Nichani, Natick, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 1176 days.

(21) Appl. No.: 11/019,931

(22) Filed: Dec. 21, 2004

Related U.S. Application Data

(63) Continuation-in-part of application No. 10/702,059, filed on Nov. 5, 2003.

(51) Int. Cl.
*G06K 9/00* (2006.01)

(52) U.S. Cl. ..................................... 382/285

(58) Field of Classification Search ............... 382/103, 382/106, 154, 274; 348/47, 143, 156, 207.1, 348/207.11, 208.12, 208.14
See application file for complete search history.

(56) References Cited

U.S. PATENT DOCUMENTS

| | | | |
|---|---|---|---|
| 3,727,034 A | | 4/1973 | Pope |
| 3,728,481 A | * | 4/1973 | Froehlich et al. ............... 348/25 |
| 3,779,178 A | | 12/1973 | Riseley, Jr. |
| 3,852,592 A | | 12/1974 | Scoville et al. |
| 4,000,400 A | | 12/1976 | Elder |
| 4,303,851 A | | 12/1981 | Mottier |
| 4,382,255 A | | 5/1983 | Pretini |
| 4,570,181 A | * | 2/1986 | Yamamura .................... 348/571 |
| 4,782,384 A | * | 11/1988 | Tucker et al. ................. 348/577 |
| 4,799,243 A | | 1/1989 | Zepke |
| 4,814,884 A | * | 3/1989 | Johnson et al. ............... 348/596 |
| 4,823,010 A | | 4/1989 | Kornbrekke et al. |
| 4,847,485 A | | 7/1989 | Koelsch |
| 4,931,864 A | * | 6/1990 | Kawamura et al. ........... 358/519 |
| 4,967,083 A | | 10/1990 | Kornbrekke et al. |
| 4,970,653 A | | 11/1990 | Kenue |
| 4,998,209 A | * | 3/1991 | Vuichard et al. .............. 382/274 |
| 5,049,997 A | * | 9/1991 | Arai .............................. 348/364 |

(Continued)

FOREIGN PATENT DOCUMENTS
DE 19709799 10/1997
(Continued)

OTHER PUBLICATIONS

Gurovich, Alexander, et al., "Automatic Door Control using Motion Recognition", *Technion, Israel Institute of Technology*, (Aug. 1999).

(Continued)

*Primary Examiner* — Vikkram Bali

(57) ABSTRACT

A system and method of auto-exposure control is provided for image acquisition hardware using three dimensional information to identify a region(s) of interest within an acquired 2D image or images upon which to apply traditional auto-exposure techniques. By performing auto-exposure analysis over the region of interest, the acquisition property settings can be assigned such that the light levels within the region of interest fall within the linear range, producing sufficient grayscale information for identifying particular objects and profiles in subsequently acquired images. For example, in a machine vision application that detects people passing through a doorway, the region of interest can be the portion of the 2D image that generated 3D features of a head and shoulders profile within a 3D model of the doorway scene. With higher quality images, more accurate detection of people candidates within the monitored scene results.

23 Claims, 14 Drawing Sheets

U.S. PATENT DOCUMENTS

| | | | |
|---|---|---|---|
| 5,075,864 A | 12/1991 | Sakai | |
| 5,097,454 A | 3/1992 | Schwarz et al. | |
| 5,142,152 A | 8/1992 | Boiucaner | |
| 5,146,340 A * | 9/1992 | Dickerson et al. | 348/311 |
| 5,196,929 A * | 3/1993 | Miyasaka | 348/169 |
| 5,201,906 A | 4/1993 | Schwarz et al. | |
| 5,208,750 A | 5/1993 | Kurami et al. | |
| 5,280,359 A * | 1/1994 | Mimura et al. | 348/230.1 |
| 5,282,045 A * | 1/1994 | Mimura et al. | 348/352 |
| 5,301,115 A | 4/1994 | Nouso | |
| 5,333,011 A * | 7/1994 | Thompson et al. | 348/363 |
| 5,353,058 A * | 10/1994 | Takei | 348/363 |
| 5,387,768 A | 2/1995 | Izard et al. | |
| 5,392,091 A * | 2/1995 | Iwasaki | 396/234 |
| 5,432,712 A | 7/1995 | Chan | |
| 5,455,685 A * | 10/1995 | Mori | 348/363 |
| 5,512,974 A * | 4/1996 | Abe et al. | 396/153 |
| 5,519,784 A | 5/1996 | Vermeulen et al. | |
| 5,529,138 A | 6/1996 | Shaw et al. | |
| 5,541,706 A * | 7/1996 | Goto | 396/231 |
| 5,552,823 A * | 9/1996 | Kageyama | 348/155 |
| 5,555,312 A | 9/1996 | Shima et al. | |
| 5,559,551 A * | 9/1996 | Sakamoto et al. | 348/169 |
| 5,565,918 A * | 10/1996 | Homma et al. | 348/364 |
| 5,581,250 A | 12/1996 | Khvilivitzky | |
| 5,581,625 A | 12/1996 | Connell et al. | |
| 5,625,415 A * | 4/1997 | Ueno et al. | 348/350 |
| 5,642,106 A | 6/1997 | Hancock et al. | |
| 5,706,355 A | 1/1998 | Raboisson et al. | |
| 5,866,887 A | 2/1999 | Hashimoto et al. | |
| 5,880,782 A * | 3/1999 | Koyanagi et al. | 348/364 |
| 5,881,171 A * | 3/1999 | Kinjo | 382/199 |
| 5,917,937 A | 6/1999 | Szeliski et al. | |
| 5,949,481 A * | 9/1999 | Sekine et al. | 348/207.99 |
| 5,959,670 A * | 9/1999 | Tamura et al. | 348/364 |
| 5,961,571 A | 10/1999 | Gorr et al. | |
| 5,995,649 A | 11/1999 | Marugame | |
| 6,014,167 A * | 1/2000 | Suito et al. | 348/169 |
| 6,028,626 A | 2/2000 | Aviv | |
| 6,031,934 A * | 2/2000 | Ahmad et al. | 382/154 |
| 6,081,619 A | 6/2000 | Hashimoto et al. | |
| 6,118,484 A * | 9/2000 | Yokota et al. | 348/350 |
| 6,167,200 A * | 12/2000 | Yamaguchi et al. | 396/65 |
| 6,173,070 B1 | 1/2001 | Michael et al. | |
| 6,195,102 B1 | 2/2001 | McNeil et al. | |
| 6,205,233 B1 | 3/2001 | Morley et al. | |
| 6,205,242 B1 | 3/2001 | Onoguchi et al. | |
| 6,215,898 B1 | 4/2001 | Woodfill et al. | |
| 6,226,396 B1 | 5/2001 | Marugame et al. | |
| 6,295,367 B1 | 9/2001 | Crabtree et al. | |
| 6,297,844 B1 | 10/2001 | Schatz et al. | |
| 6,301,440 B1 * | 10/2001 | Bolle et al. | 396/128 |
| 6,307,951 B1 * | 10/2001 | Tanigawa et al. | 382/103 |
| 6,308,644 B1 | 10/2001 | Diaz | |
| 6,345,105 B1 | 2/2002 | Nitta et al. | |
| 6,362,875 B1 | 3/2002 | Burkley | |
| 6,370,262 B1 * | 4/2002 | Kawabata | 382/106 |
| 6,408,109 B1 | 6/2002 | Silver et al. | |
| 6,469,734 B1 | 10/2002 | Nichani et al. | |
| 6,496,204 B1 | 12/2002 | Nakamura | |
| 6,496,220 B2 | 12/2002 | Landert et al. | |
| 6,516,147 B2 * | 2/2003 | Whiteside | 396/61 |
| 6,678,394 B1 | 1/2004 | Nichani | |
| 6,690,354 B2 | 2/2004 | Sze | |
| 6,701,005 B1 | 3/2004 | Nichani | |
| 6,710,770 B2 | 3/2004 | Tomasi et al. | |
| 6,720,874 B2 | 4/2004 | Fufido et al. | |
| 6,734,904 B1 * | 5/2004 | Boon et al. | 348/234 |
| 6,756,910 B2 | 6/2004 | Ohba et al. | |
| 6,791,461 B2 | 9/2004 | Oku et al. | |
| 6,829,371 B1 | 12/2004 | Nichani et al. | |
| 6,914,599 B1 * | 7/2005 | Rowe et al. | 345/420 |
| 6,919,549 B2 | 7/2005 | Bamji et al. | |
| 6,940,545 B1 * | 9/2005 | Ray et al. | 348/222.1 |
| 6,963,661 B1 | 11/2005 | Hattori et al. | |
| 6,970,199 B2 * | 11/2005 | Venturino et al. | 348/333.02 |
| 6,980,251 B1 * | 12/2005 | Tamura et al. | 348/362 |
| 6,999,600 B2 | 2/2006 | Venetianer et al. | |
| 7,003,136 B1 | 2/2006 | Harville | |
| 7,034,881 B1 * | 4/2006 | Hyodo et al. | 348/333.12 |
| 7,042,492 B2 | 5/2006 | Spinelli | |
| 7,058,204 B2 | 6/2006 | Hildreth et al. | |
| 7,088,236 B2 | 8/2006 | Sorensen | |
| 7,110,569 B2 * | 9/2006 | Brodsky et al. | 382/103 |
| 7,146,028 B2 * | 12/2006 | Lestideau | 382/118 |
| 7,260,241 B2 | 8/2007 | Fukuhara et al. | |
| 7,358,994 B2 * | 4/2008 | Yano | 348/254 |
| 7,382,895 B2 | 6/2008 | Bramblet et al. | |
| 7,471,846 B2 * | 12/2008 | Steinberg et al. | 382/274 |
| 7,538,801 B2 * | 5/2009 | Hu et al. | 348/229.1 |
| 7,663,689 B2 * | 2/2010 | Marks | 348/370 |
| 2001/0010731 A1 | 8/2001 | Miyatake et al. | |
| 2001/0030689 A1 | 10/2001 | Spinelli | |
| 2002/0039135 A1 | 4/2002 | Heyden | |
| 2002/0039137 A1 * | 4/2002 | Harper et al. | 348/207 |
| 2002/0041698 A1 | 4/2002 | Ito et al. | |
| 2002/0113862 A1 * | 8/2002 | Center et al. | 348/14.08 |
| 2002/0118113 A1 | 8/2002 | Oku et al. | |
| 2002/0118114 A1 | 8/2002 | Ohba et al. | |
| 2002/0135483 A1 | 9/2002 | Merheim et al. | |
| 2002/0145667 A1 * | 10/2002 | Horiuchi | 348/207.99 |
| 2002/0150308 A1 * | 10/2002 | Nakamura | 382/286 |
| 2002/0191819 A1 | 12/2002 | Hashimoto et al. | |
| 2003/0053660 A1 | 3/2003 | Heyden | |
| 2003/0067551 A1 * | 4/2003 | Venturino et al. | 348/364 |
| 2003/0071199 A1 | 4/2003 | Esping et al. | |
| 2003/0164892 A1 * | 9/2003 | Shiraishi et al. | 348/349 |
| 2003/0184673 A1 * | 10/2003 | Skow | 348/364 |
| 2004/0017929 A1 * | 1/2004 | Bramblet et al. | 382/103 |
| 2004/0036596 A1 | 2/2004 | Heffner et al. | |
| 2004/0045339 A1 | 3/2004 | Nichani et al. | |
| 2004/0061781 A1 | 4/2004 | Fennell et al. | |
| 2004/0109059 A1 * | 6/2004 | Kawakita | 348/143 |
| 2004/0153671 A1 | 8/2004 | Schuyler et al. | |
| 2004/0201730 A1 * | 10/2004 | Tamura | 348/229.1 |
| 2004/0218784 A1 | 11/2004 | Nichani et al. | |
| 2005/0074140 A1 | 4/2005 | Grasso et al. | |
| 2005/0088536 A1 * | 4/2005 | Ikeda | 348/222.1 |
| 2005/0105765 A1 | 5/2005 | Han et al. | |
| 2005/0157204 A1 * | 7/2005 | Marks | 348/370 |
| 2005/0163345 A1 * | 7/2005 | van den Bergen et al. | 382/103 |
| 2005/0249382 A1 | 11/2005 | Schwab et al. | |
| 2006/0139453 A1 | 6/2006 | Spinelli | |
| 2009/0110058 A1 * | 4/2009 | Shen | 375/240.01 |

FOREIGN PATENT DOCUMENTS

| | | |
|---|---|---|
| EP | 0 847 030 A2 | 6/1998 |
| EP | 0 847 030 A3 | 12/1999 |
| EP | 1035510 A2 * | 9/2000 |
| EP | 0 706 062 B1 | 5/2001 |
| EP | 0 817 123 | 9/2001 |
| EP | 1313321 | 5/2003 |
| WO | WO-96/31047 | 10/1996 |
| WO | WO-96/38820 | 12/1996 |
| WO | WO-98/08208 | 2/1998 |
| WO | WO-01/75809 | 10/2001 |
| WO | WO-02/48971 | 6/2002 |
| WO | WO-02/095692 | 11/2002 |
| WO | WO-2004023782 | 3/2004 |
| WO | WO-2006067222 | 6/2006 |

OTHER PUBLICATIONS

Kalman, R. E., "A New Approach to Linear Filtering and Prediction Problems", *Transactions of the ASME, The Journal of Basic Engineering*, 8, (1960),pp. 35-45.

Kanade, T. , et al., "A Stereo Machine for Video-rate Dense Depth Mapping and Its New Applications", *Proc. IEEE Computer Vision and pattern Recognition*, (1996),pp. 196-202.

Norris, Jeffery , "Face Detection and Recognition in Office Environments", *Department fo Electrical Engineering and Computer Science*, Massachusetts Institute of Technology,(May 21, 1999).

Tsai, R. Y., "A Versatile Camera Calbination Technique for High-Accuracy 3D Machine vision Metrology using off-the-shelf TV Cameras and Lenses", *IEEE J. Robotics and Automation*, vol. 3, No. 4, (Aug. 1987),pp. 323-344.

Zhang, Z., "A Flexible New Technique for Camera Calibration", *Technical Report MSR-TR-98-71*, Microsoft Research, Microsoft Corporation,(Mar. 25, 1996),pp. 1-22.

Prati, A., et al., "Detecting Moving Shadows: Algorithms and Evaluations", *IEEE Transactions on Pattern Analysis and Machine Intelligence*, vol. 25, No. 7,(2003),pp. 918-923.

Beynon, et al., Detecting abandoned packages in a multi-camera video surveillance system, Advanced Video and Signal Based Surveillance, 2003 Proceedings, IEEE Conference on Jul. 21-22, 2003, pp. 221-228 XP010648388 ISBN: 0-7695-1971-7.

Burschka, et al., Scene Classification from Dense Disparity Maps in Indoor Environments, Proceedings of ICPR 2002, (Aug. 2002).

Canesta, Inc., Development Platform—DP200, Electronic Perception Technology—Real-time single chip 3D imaging, 11005-01 Rev 2,(Jul. 12, 2004).

CSEM SA, Swiss Ranger SR-2 Datasheet, CSEM Technologies for innovation, www.csem.ch, imaging@csem.ch, Bandenerstrasse 569, CH 8048, Zurich, Switzerland, (2004).

Dhond, et al., Structure from Stereo—A Review, IEEE Transactions on Systems, Man, and Cybernetics, vol. 19 No. 6, (Dec. 1989).

Gluckman, Joshua et al., Planar Catadioptric Stereo: Geometry and Calibration, IEEE, (1999).

Jain, et al., Machine Vision, Chapter 11—Depth, MIT Press and McGraw-Hill Inc. 1995,pp. 289-297.

Pollard, Stephen P., et al., A Stereo Correspondence Algorithm using a disparity gradient limit, Perception, vol. 14, (1985), 449-470.

Roeder-Johnson Corporation, Low-cost, Broadly-Available Computer/Machine Vision Applications Much Closer with New Canesta Development Platform, Press Release, San Jose, CA, (Aug. 10, 2004).

Weng, Agglomerative Clustering Algorithm, www.speech.sri.com, (1997).

* cited by examiner

SYSTEM AND METHOD OF AUTO-EXPOSURE CONTROL FOR IMAGE ACQUISITION HARDWARE USING THREE DIMENSIONAL INFORMATION

RELATED APPLICATION

This application is a continuation-in-part of U.S. application Ser. No. 10/702,059, filed Nov. 5, 2003. The entire teachings of the above application are incorporated herein by reference.

BACKGROUND OF THE INVENTION

Imaging sensors are light sensitive devices that convert light into electrical charges. Imaging sensors used in most digital imaging systems are charge-coupled devices (CCD) or complementary metal oxide semiconductor (CMOS) devices. These devices are typically composed of an array of light sensitive diodes called pixels that convert photons into electrons when exposed to light. The electrical charge that accumulates at each pixel on the imaging sensor array is proportional to the brightness of the light that reaches the pixel during the period of exposure. An electrical signal output from the device represents the collection of charges from the pixels and is used to generate an image.

Commercially available CCD and CMOS sensors have a limited range of light levels they can linearly convert into image pixels. This linear range can be adjusted by altering combinations of image acquisition property settings of image acquisition hardware, such as a video camera. Acquisition property settings comprise those properties that alter the acquisition hardware and, thus, the linear range of the image acquisition system. The properties include, but are not limited to, exposure time, gain, offset, contrast, and brightness. Acquisition property settings also comprise properties controlling the light levels in the scene. Such properties include, but are not limited to, controlling the illumination provided by fixed lights, strobe lights, or structured lighting. Light levels outside the linear range are clamped or clipped to the minimum or maximum electrical signal.

For example, FIG. 1 is a diagram illustrating the manner in which the range of light levels in a scene 10 typically corresponds to a pixel intensity value 20. Although most image sensors represent pixel intensity as an 8-bit value, the range of pixel intensity values 30 is shown as a 3-bit value for clarity. The light levels in the scene 10 that fall within the linear range are differentiable in an acquired image. In other words, within the linear range, pixel intensity varies proportionally to the light level in the scene. The range of light levels in the scene that fall outside the linear range will be either 0 or 7 and, therefore, not differentiable in an image. Setting the linear range too small relative to the light levels in the scene being acquired causes many of the objects in the scene to appear black or white with no grayscale information. Setting the linear range too large relative to the light levels in the scene causes many of the objects to also lose grayscale information as a single pixel intensity value represents a large range of light levels.

It should be noted that the conversion of photons to an electrical signal is inherently linear in silicon based sensors. The conversion of photons to an electrical signal in other sensor technologies may not be linear. The remainder of this application assumes the conversion is linear to make the description of the invention clearer.

Auto-exposure is a process for dynamically setting the acquisition property settings according to the pixel intensity values of one or more recently acquired images. In other words, auto-exposure is the automated process of choosing the correct combination of exposure setting, gain setting, offset and other property settings to yield an optimal linear range for the machine vision application. The purpose of auto-exposure is to improve the quality of acquired images and, in turn, to improve one or more aspects of the performance of the machine vision application using the acquired images. Auto-exposure often improves the accuracy, robustness, reliability, speed, and/or usability of a machine vision application. Traditional auto-exposure techniques include the various methods for performing auto-exposure known to those skilled in the art.

SUMMARY OF THE INVENTION

Traditional auto-exposure techniques are implemented directly in the image acquisition hardware or software. Such techniques involve image analysis of one or more acquired images and subsequent adjustment of the acquisition property settings of the image acquisition hardware to yield the optimal linear range.

The image analysis typically involves computation of a histogram that represents the distribution of pixel values found within fixed portions of one or more acquired images. The fixed portions may include the entire image or a set of pixel blocks containing only part of the image. The pixel blocks are fixed in dimension and location within each acquired image. The computed histogram is then compared with a model histogram. Based on the differences between the computed and model histograms, the acquisition property settings of the image acquisition hardware are adjusted so that the computer histogram matches the desired pixel distribution of the model histogram.

By applying such traditional auto-exposure techniques against entire images or fixed pixel blocks, the acquisition property settings, and thus the linear range of differentiable pixel values, are adjusted to obtain an optimal level of grayscale information from subsequently acquired images. Changes in ambient lighting conditions, object reflectivity, and moving objects within the scene can cause the distribution of pixels represented in the computed histogram of pixel values to deviate from the model histogram. The auto-exposure process then re-adjusts the acquisition property settings to bring the computed histograms of subsequent acquisitions in line with the model histogram. When the computed histogram is performed on entire images or fixed pixel blocks, it is optimizing the acquisition property settings for those sets of pixels. As a consequence, machine vision applications that attempt to locate or detect particular objects with imaging characteristics that differ from the rest of the scene and/or that are not a dominant portion of the scene, can suffer due to a lack of sufficient grayscale information for the objects of interest.

For example, a particular machine vision application is described in U.S. patent application Ser. No. 10/702,059, filed Nov. 5, 2003, the entire teachings of which are incorporated herein by reference. Specifically, a three-dimensional (3D) imaging system is described that detects people passing through a doorway or other portal. According to one embodiment, the system employs a pair of video cameras having image sensors that capture images about a portal, such as a revolving door, a sliding door, a swinging door, or a man trap. These captured images are then used to generate a 3D model of the scene that can be analyzed to detect people attempting to pass through the portal. A person is identified by 3D features within the 3D model that correspond to a head and shoulder profile.

This system can be deployed at a main entrance doorway or other monitored portal exit where ambient light conditions in the form of sunlight can change throughout the course of a day. Such changes in lighting conditions can adversely affect the clarity of the images captured through the image sensors. For example, the acquired images may be substantially black when captured at midnight or substantially white when captured at midday. Shadows may also appear about the portal scene. Such lighting effects can cause the distribution of pixel values within the scene to be skewed either too dark or too bright, resulting in the linear range being set too large or too small, respectively. As a consequence, the 3D model of the scene generated by the 3D imaging system from the acquired 2D images can lack sufficient grayscale information to locate the desired head and shoulder profiles of the people candidates.

In contrast, the present invention is a system and method of auto-exposure control for image acquisition hardware using 3D information to identify a region of interest within an acquired 2D image upon which to apply traditional auto-exposure techniques. Specifically, the invention includes (i) acquiring 2D images of a scene from one or more cameras having an initial image acquisition property setting; (ii) detecting 3D features from the 2D images; (iii) locating a region of interest from the 3D features; and (iv) determining a next acquisition property setting from brightness levels within the region of interest to apply to the one or more cameras. The region of interest and the acquisition property setting can be adjusted as the 3D features are tracked across further 2D images. The region of interest can include 3D features that correspond to a human or other vertebrate body part, such as a head and shoulders profile.

By performing auto-exposure analysis over the region of interest as determined from 3D analysis of the acquired images, the acquisition property settings can be assigned such that the light levels within the region of interest fall within the linear range, producing sufficient grayscale information for identifying particular objects and profiles in subsequently acquired images. For example, in a machine vision application that detects people passing through a doorway, the region of interest can be the portion of the 2D image that generates 3D features of a head and shoulders profile within a 3D model of the doorway scene. With higher quality images, more accurate detection of people candidates within the monitored scene results.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Machine vision applications are directly affected by a sensor's ability to linearly represent the light levels of the objects of interest in the scene being acquired. Ideally, the linear range is adjusted so its dark end includes the light levels from the darkest objects of interest and its bright end includes the light levels from the brightest objects of interest.

For many applications, where the light level is static, the linear range can be adjusted once by configuring the acquisition property settings of the image acquisition hardware and then used indefinitely. For other applications, where the ambient light level is not static or the reflectivity of the objects of interest is changing, the linear range must be adjusted dynamically. The most difficult applications are those with changing ambient light levels, changing reflectivity of the objects of interest, and where the objects of interest are moving in the scene.

Figure 1:
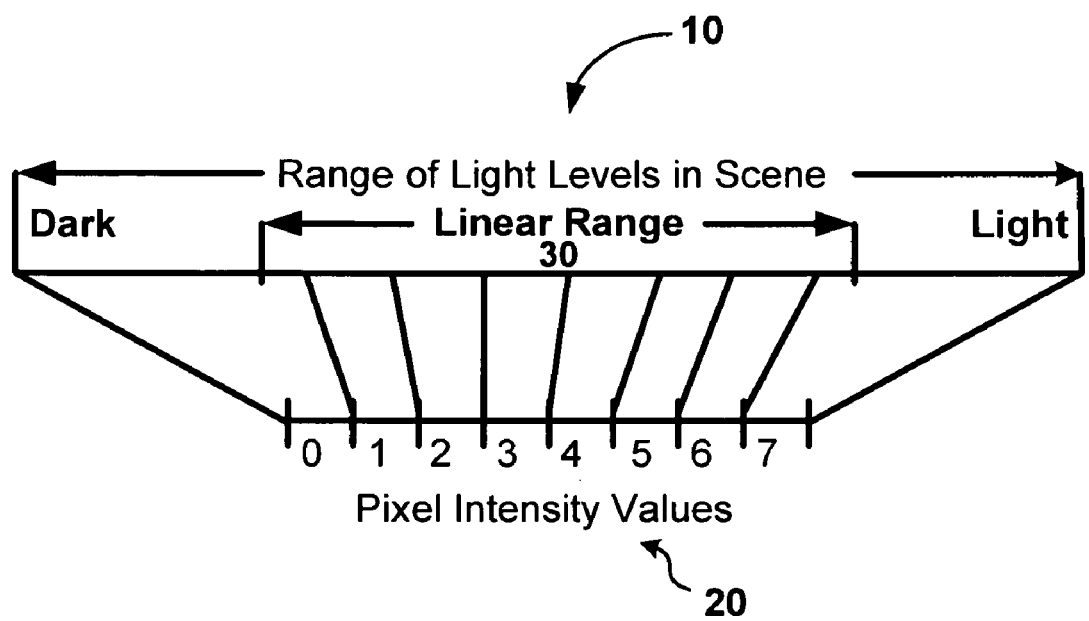
FIG. 1 is a diagram illustrating the manner in which the range of light levels in a scene typically correspond to a pixel intensity value.
Figure 2:
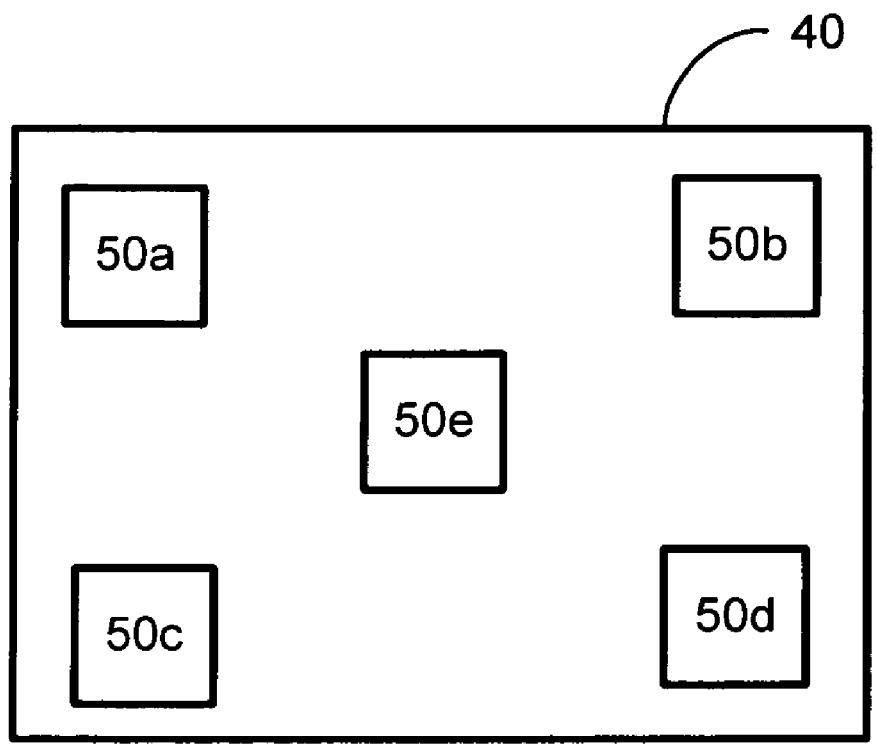
FIG. 2 is a diagram illustrating a fixed set of pixel blocks for auto-exposure analysis of an acquired image.

Traditional auto-exposure techniques determine the acquisition property settings based on an image analysis of the distribution of pixel values within the entire image or a fixed set of pixel blocks that contain only a portion of the image. FIG. 2 is a diagram illustrating a fixed set of pixel blocks for auto-exposure analysis of an acquired image. As shown, each pixel block, collectively 50, contains only a part of the entire image 40.

The use of the entire image or fixed pixel blocks causes the acquisition property settings to optimize the linear range for those sets of pixels. As a consequence, machine vision applications that attempt to locate or detect particular objects within the scene with imaging characteristics that differ from the rest of the scene and/or that are not a dominant portion of the scene, can suffer due to a lack of sufficient grayscale information for the objects of interest. If the set linear range is too small or too large for the objects of interest, then the greyscale information for the objects of interest is not optimal.

The present invention is a system and method of auto-exposure control for image acquisition hardware using 3D information to identify a region of interest within an acquired 2D image upon which to apply traditional auto-exposure techniques. By limiting auto-exposure analysis to the region of interest, the acquisition property settings can be assigned such that the light levels within the region of interest only fall within the linear range, producing differentiable and optimal grayscale information in subsequent acquired images. For example, in a machine vision application that detects people passing through a doorway, the region of interest can be the portion of the 2D image that generates 3D features of a head and shoulders profile within a 3D model of the doorway scene as shown in FIGS. 3A-3C.

Figures 3A, 3B:
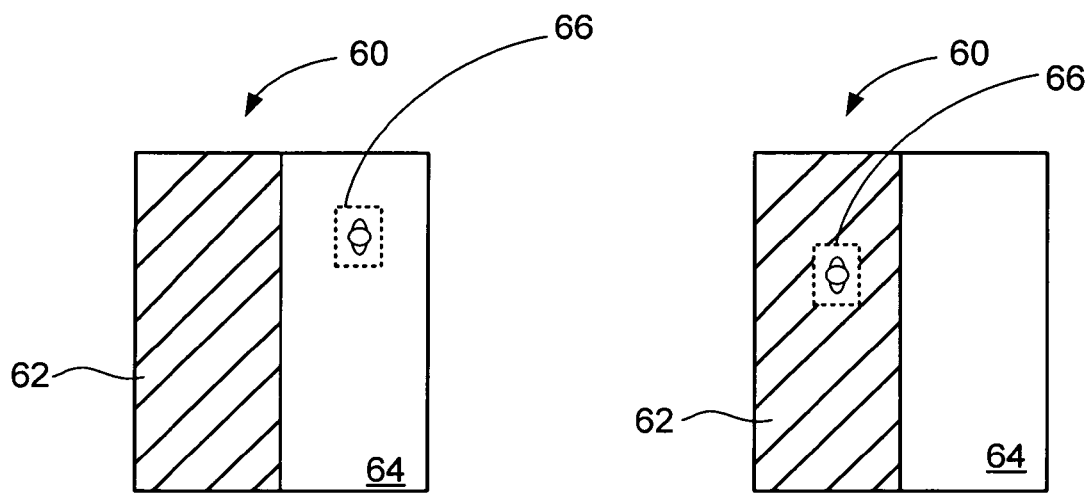
FIGS. 3A-3C are diagrams illustrating regions of interest within acquired images that contain the head and shoulder profile of people candidates according to one embodiment.
Figure 3C:
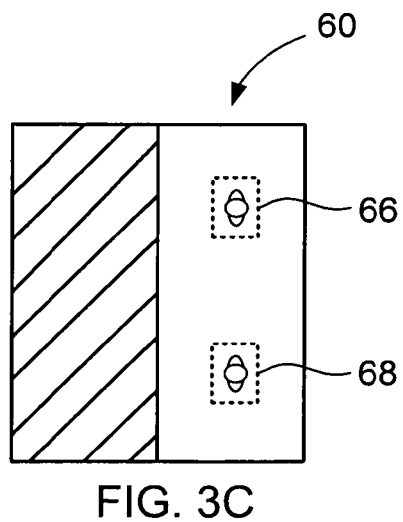

FIG. 3A is a diagram illustrating an image 60 of a scene having a dark portion 62 and a bright portion 64. As shown, the region of interest 66 is a bounding box surrounding the portion of the image that contains the head and shoulder profile of a people candidate as determined by 3D analysis. The remainder of the image, including the dark portion 62, is excluded from auto-exposure processing. Likewise in FIG. 3B, only the bounding box 66 containing the header/shoulder profile is include in the region of interest for auto-exposure processing. FIG. 3C illustrates that multiple regions of interest can be identified in an acquired image for auto-exposure processing As shown, the region of interest in FIG. 3C includes two regions of interest 66, 68 corresponding to two people candidates traversing the monitored area.

Specifically, the invention includes (i) acquiring 2D images of a scene from one or more cameras having an initial set of image acquisition property settings; (ii) detecting 3D features from the 2D images; (iii) locating a region(s) of interest in the 2D images from the 3D features; and (iv) determining a next acquisition property setting from brightness levels within the region of interest to apply to the one or more cameras. The region of interest can include 3D features that correspond to a profile of a human or other vertebrate body part, such as a head and shoulders profile. The region of interest and the acquisition property settings can be adjusted as the 3D features of the head and shoulders profile are tracked across further 2D images.

As previously mentioned, one or more cameras may be used to acquire the 2D images of a scene from which 3D information can be extracted. According to one embodiment, multiple video cameras operating in stereo may be used to acquire 2D image captures of the scene. In another embodiment, a single camera may be used, including stereo cameras and so-called "time of flight" sensor cameras that are able to automatically generate 3D models of a scene. In still another embodiment, a single moving camera may be used to acquire 2D images of a scene from which 3D information may be extracted. In still another embodiment, a single camera with optical elements, such as prisms and/or mirrors, may be used to generate multiple views for extraction of 3D information. Other types of cameras know to those skilled in the art may also be utilized.

Figure 4:
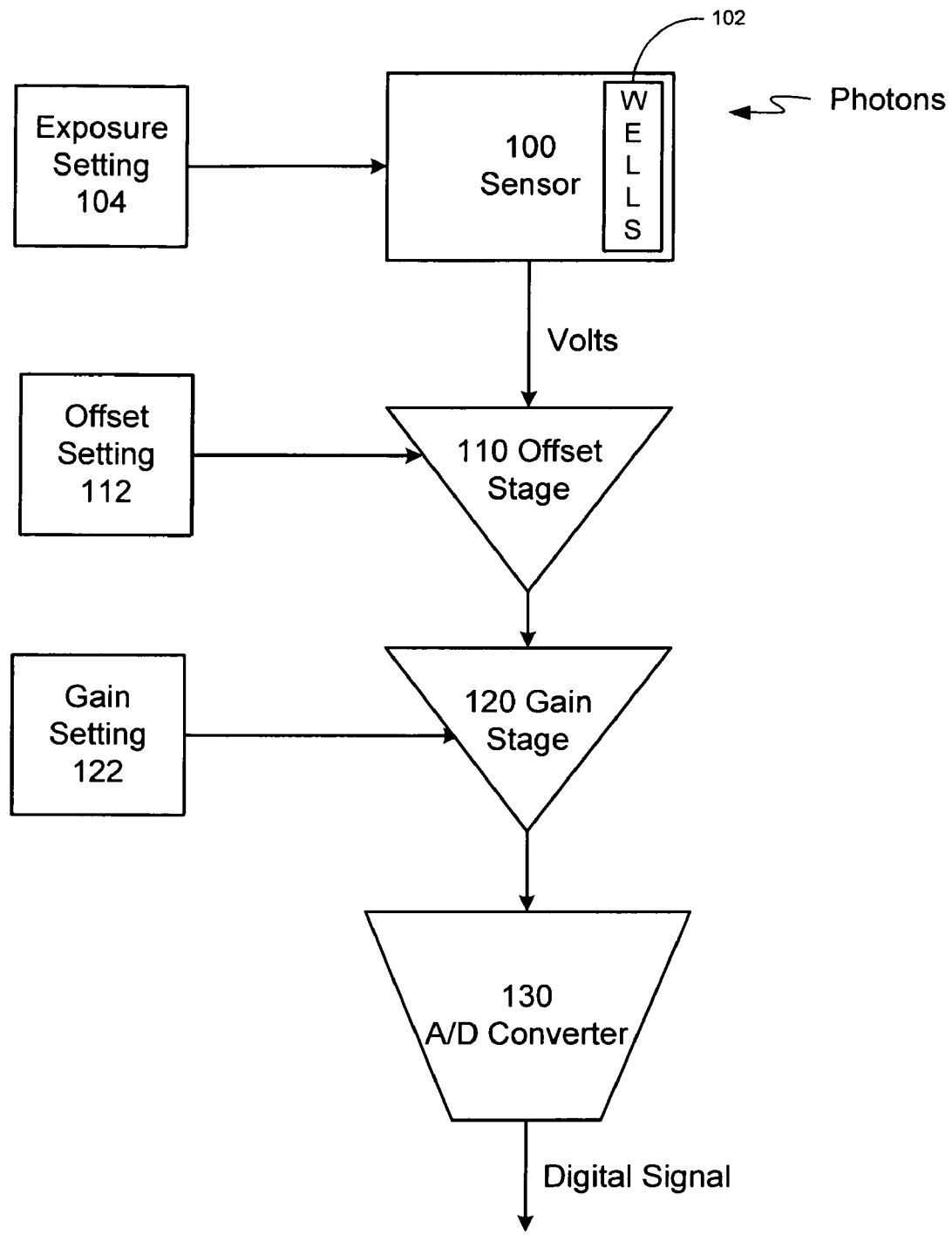
FIG. 4 is a schematic diagram of prototypical image acquisition hardware to which embodiments of the invention may be applied.

FIG. 4 is a schematic diagram of prototypical image acquisition hardware to which embodiments of the invention may be applied. The key function of the acquisition hardware is the conversion of light rays into a signal that can be digitally sampled. The digital samples are the pixel values in the acquired image. Various types of acquisition hardware are available today. The specific details of the acquisition hardware are not germane to the description of this invention. As such, a brief description of prototypical acquisition hardware is provided to aid in better understanding the invention. For example, typical image acquisition hardware can include a sensor device 100, an offset stage 110, a gain stage 120, and an analog-to-digital (A/D) converter 130.

The sensor device 100 is generally comprised of a one- or two-dimensional (1D or 2D) array of wells 102. The purpose of each well is to convert the light (i.e., photons) striking the well into an electrical signal (i.e., volts). The two most widely used and available sensor technologies today are Charge Coupled Devices (CCDs) and Complementary Metal Oxide Semiconductors (CMOS). The details of each are readily available from the sensor and/or camera manufacturers.

The exposure setting 104 on the sensor device determines the duration of time each well collects photons. There is a tradeoff in choosing an exposure setting. A longer exposure setting allows more photons to be collected in each well thereby increasing the signal strength and, in turn, the signal to noise ratio. The downside to long exposure settings is motion in the scene being acquired will appear blurry and bright objects in the scene may cause the wells to overflow. This latter condition is called saturation.

The offset stage 110 allows an application to adjust the light level by an offset 112 that will correspond to a digital signal level of 0.

The gain stage 120 allows adjustment of the voltage range by a gain setting 122 applied to the A/D converter 130. The gain stage is normally adjusted such that the objects of interest in the acquired image have pixels values less than 255.

The A/D converter (block 130) is typically designed such that a 0.0 volt input results in a digital signal output of 0 and a 1.0 volt input results in the maximum digital signal output. For example, a 1.0 volt input to an 8 bit A/D converter would result in a digital signal output of 255. An 8 bit A/D converter will be assumed from hereon.

Figure 5:
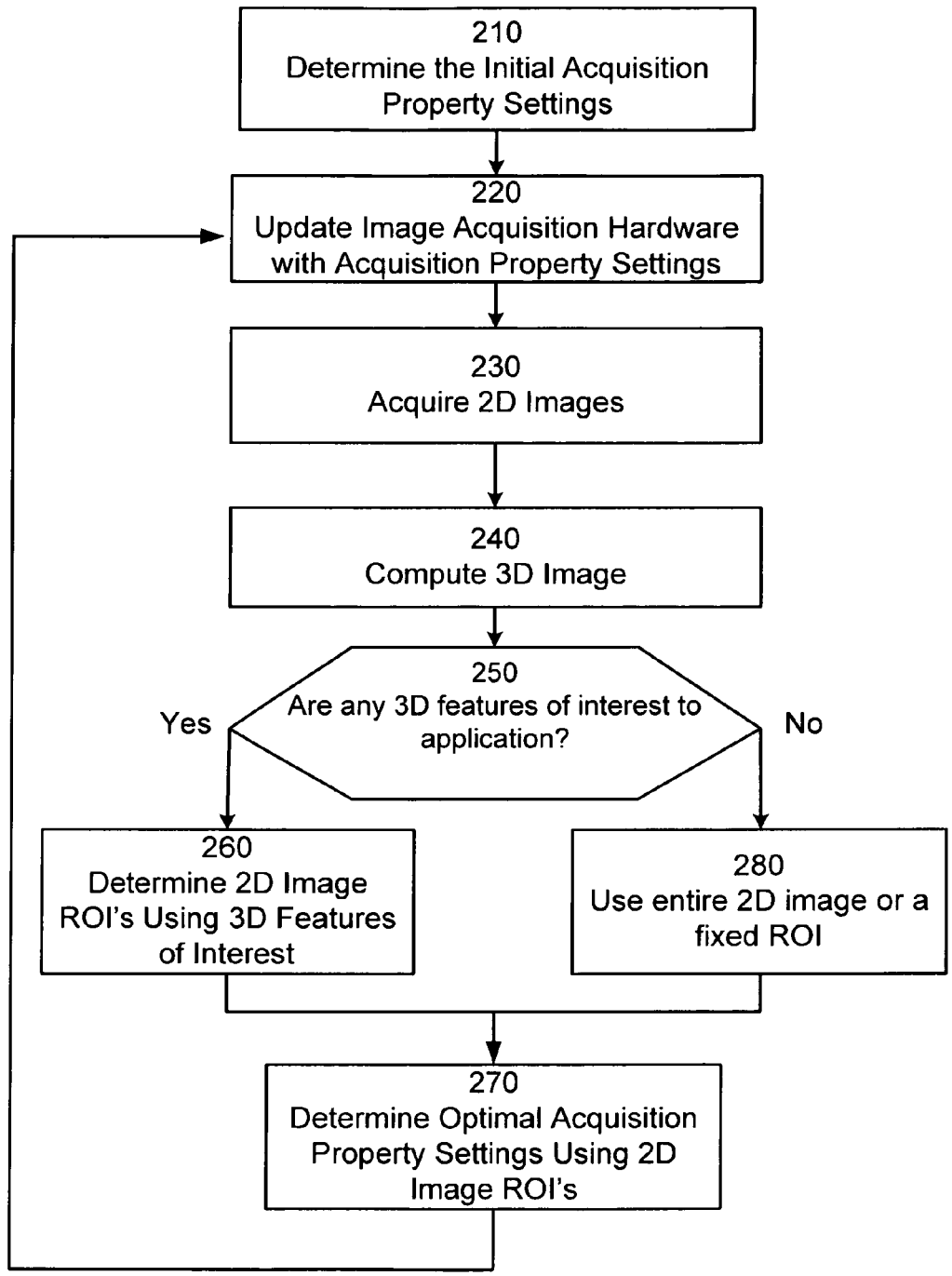
FIG. 5 is a flow diagram of a method for adjusting the linear range of the image acquisition hardware using 3D information obtained from 2D stereo images of a scene according to one embodiment.

FIG. 5 is a flow diagram of a method for adjusting the linear range of the image acquisition hardware using 3D information obtained from 2D stereo images of a scene according to one embodiment.

At 210, a set of initial acquisition property settings are chosen. The initial settings can be chosen in a number of ways. The initial settings can be default values determined and stored at system setup time or determined using traditional auto-exposure techniques.

At 220, the image acquisition hardware is updated with the acquisition property settings computed at 210, or 270. Details of this step depend on the specifics of the acquisition hardware used (e.g., sensors/surrounding circuitry, cameras, frame grabbers, and lights).

At 230, a new set of 2D images is acquired for 3D feature extraction. The acquisition process is hardware dependent.

At 240, 3D features are computed from the 2D images previously acquired. The process of computing 3D features from 2D images can be implemented by a number of techniques known to those skilled in the art. For example, U.S. patent application Ser. No. 10/702,059, filed Nov. 5, 2003 discloses a method for generating a 3D model of a scene from multiple, simultaneously acquired 2D images of the scene.

At 250, 3D features of interest are extracted from the complete set of 3D features. The goal in this step is to extract or segment the 3D features of interest from everything else in the 3D model of the scene. This feature extraction step can be done using a combination of 2D and 3D information. Feature extraction techniques include, but are not limited to, discrimination based on distance from the sensor(s), color, grayscale, position, shape, or topology. In an exemplary embodiment, the 3D contour of shapes is the discriminator. For example, in the U.S. patent application Ser. No. 10/702,059, filed Nov. 5, 2003, entitled "METHOD AND SYSTEM FOR ENHANCED PORTAL SECURITY THROUGH STEREOSCOPY," the 3D features of interest include one or more combinations of 3D features that each represent a head and shoulder profile of a people candidate.

If there are no 3D features of interest found at 250, the process reverts back to using one of the traditional auto-exposure techniques of using the entire 2D image(s) or a fixed set of pixel blocks at 280. The condition where no features are found arises when there are no 3D features of interest present or when there are 3D features of interest present in the scene but undetectable in the acquired images because of incorrect acquisition property settings.

According to one embodiment, when no 3D features of interest are found, the entire image is used as the basis for performing auto-exposure. Other embodiments could handle the lack of 3D features of interest by other means. Below are examples of alternative strategies:

- Compute the acquisition property settings using one of the traditional auto-exposure techniques;
- Reverting back to the last acquisition property settings that yielded 3D features of interest;
- Rerunning the 3D feature computation/extraction steps using a different feature computer or extractor;
- Randomly varying the acquisition property settings; and
- Steadily increasing or decreasing one or more of the acquisition property settings.

The best strategy depends on the application and, in particular, the variability of the ambient light, the object(s) of interest in the scene, and the robustness/aggressiveness of the feature computer/extractor.

Conversely, if 3D features of interest are found at 250, the process continues at 260. At 260 the 3D features of interest found at 250 are used to choose a region of interest (ROI) or multiple ROI in the two-dimensional (2D) acquired images or in the rectified images. The ROI(s) specify the set of pixels to be used for computing the acquisition property settings. The simplest technique is to define a ROI that contains the pixels corresponding to the 3D features of interest extracted at 250.

However, different machine vision libraries and applications have different ROI requirements/constraints. For example, some applications require ROI's be rectangular and aligned with the acquired image pixel grid. For such applications, one can define a ROI to be the bounding box of the pixels corresponding to a 3D feature. Other applications may choose to use morphology operations to alter the shape or size of the area of the pixels corresponding to the extracted features.

According to one embodiment, a single region of interest (ROI) is computed at 260 based on the topography found in the 3D model of the scene in the form of a depth image. For example, the region of interest (ROI) can be in the form of a bitmap containing "care" and "don't care" pixel values. The care pixels in the ROI specify the pixels in the 2D acquired image that are used for performing auto-exposure.

At 270 auto-exposure techniques are performed on the one or more regions of interest determined at 260 or 280. The result of step 270 is a new set of acquisition property settings yielding an optimal linear range for the objects of interest in the scene.

By applying traditional auto-exposure algorithms to a dynamic region of interest that depends on the location of 3D features of interest, the auto-exposure algorithms can determine the optimal range that will provide the best quality 2D images with respect to the portions of the image that include the 3D features of interest.

Figure 6A:
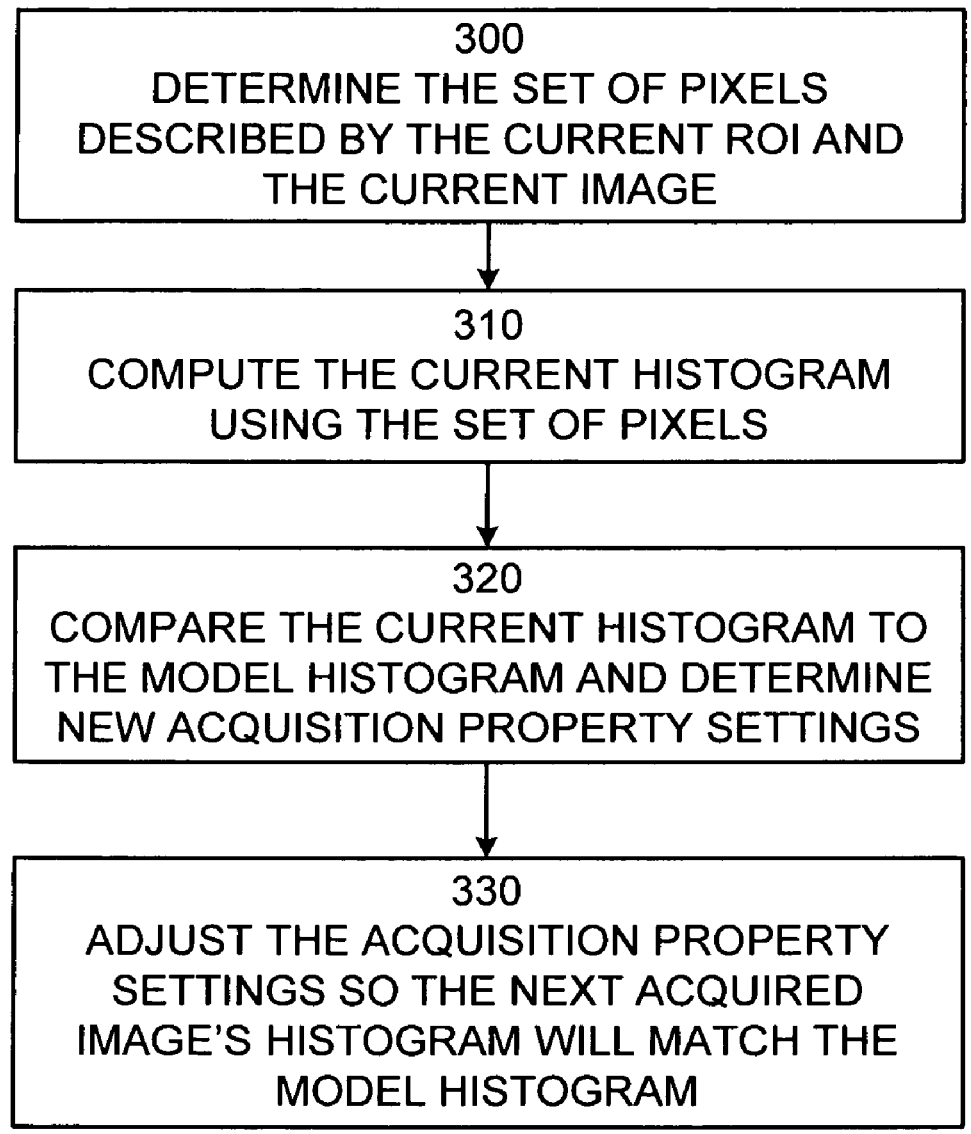
FIG. 6A is a flow diagram of an auto-exposure algorithm according to one embodiment.

FIG. 6A is a flow diagram of an auto-exposure algorithm according to one embodiment. The goal of any auto-exposure algorithm is to analyze one or more of the most recently acquired images and determine how best to modify one or more of the acquisition property settings to improve the performance of the machine vision application.

At 300, the current region of interest (ROI) is used to determine the set of pixels in the acquired image to be analyzed.

Figure 6B:
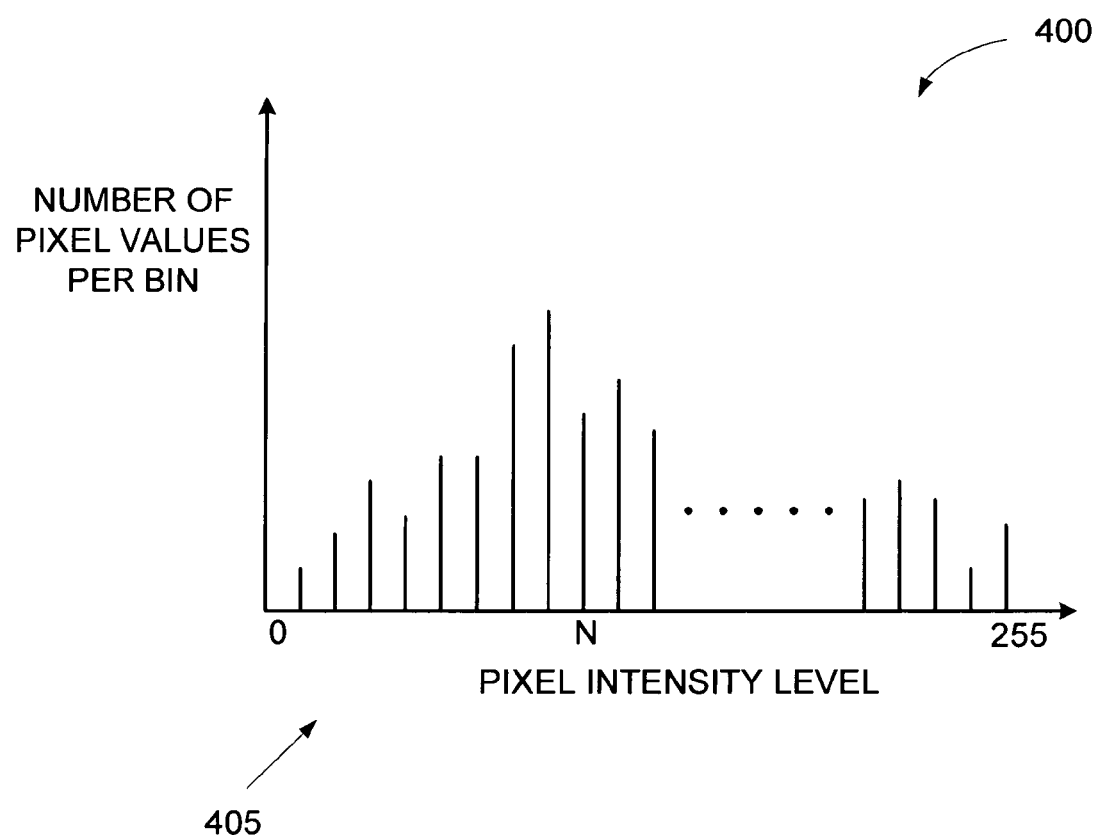
FIG. 6B is a diagram of a histogram of pixel values contained within the region of interest of an acquired image.

At 310, the set of pixels identified at 300 are analyzed using histogram analysis to generate a histogram of the set of pixels in the current region of interest as shown in FIG. 6B.

FIG. 6B is a diagram of a histogram of pixel values contained within the region of interest of an acquired image. The use of histograms is one way to quantify the distribution of a set of pixels present in an image. A histogram 400 is comprised of a set of bins 405. There is typically one bin for each pixel intensity level in the image. Thus, an 8 bit image has 256 intensity levels and a corresponding histogram of 256 bins. Bin N in the histogram contains a count of the number of pixels in the image with an intensity level of N. A useful metric of a histogram is histogram accumulation. Histogram accumulation specifies the percentage of pixels in the image between bin 0 and bin N. The histogram accumulation at bin N is defined as the sum of the counts in bin 0 through bin N, divided by the sum of the counts in bin 0 through the last bin.

Referring back to FIG. 6A at 320, a model histogram is compared to the computed histogram from 310. The model histogram quantifies the desired distribution of pixel intensities from an acquired image. After comparing the model and computed histograms, a new set of acquisition property settings is computed. The goal in the computation of the new set of acquisition property settings is to determine the set that would yield a computed histogram similar or substantially identical to the model histogram.

At 330, the acquisition property settings of the acquisition hardware are adjusted with the acquisition property settings computed at 320 so that the computed histogram of the next acquired image substantially match the model histogram (assuming no changes in the scene).

Embodiments of the invention may be applied to a number of machine vision applications in many industries, including: semiconductors, electronics, pharmaceuticals, automotive, healthcare, packaging, consumer products, and high speed inspection of materials such as steel, paper, nonwovens, and security. For example, a particular application of the invention includes auto-exposure control using three dimensional information for a people-sensing door security system, which is described in U.S. patent application Ser. No. 10/702,059, filed Nov. 5, 2003, entitled "METHOD AND SYSTEM FOR ENHANCED PORTAL SECURITY THROUGH STEREOSCOPY," the entire teachings of the above application are incorporated herein by reference. Although specific reference is made to a door security system, embodiments of the invention may be applied to any type of portal security system including those without doors.

Automated and manual security portals provide controlled access to restricted areas. Security portals are usually equipped with card access systems, biometric access systems, or other systems for validating a person's authorization to enter restricted areas. Examples of automated security portals include revolving doors, mantraps, sliding doors, and swinging doors. A typical security issue associated with most access controlled portal security systems is that when one person obtains valid access, an unauthorized person may bypass the validation security by "piggybacking" or "tailgating."

The '059 Application discloses a 3D imaging system for detecting and responding to such breaches of security. Specifically, the '059 Application discloses a portal security system that provides enhanced portal security through stereoscopy, such as a stereo door sensor. The stereo door sensor detects portal access events and optionally prevents access violations, such as piggybacking and tailgating. The stereo door sensor is a video based people sensor that generates three dimensional models from plural two dimensional images of a portal scene and further detects and tracks people candidates moving through a target volume within the model.

Embodiments of the present invention can improve the performance of the stereo door sensor by using 3D information to dynamically identify a region of interest within an acquired 2D image upon which to apply traditional auto-exposure techniques. By performing auto-exposure analysis over the region of interest, the acquisition property settings can be assigned such that the light levels within the region of interest fall within the linear range, producing differentiable grayscale information in subsequently acquired images. For example, in stereo door sensor, the region of interest can be the portion of the 2D image that generated 3D features of a head and shoulders profile within a 3D model of the doorway scene.

Figure 7:
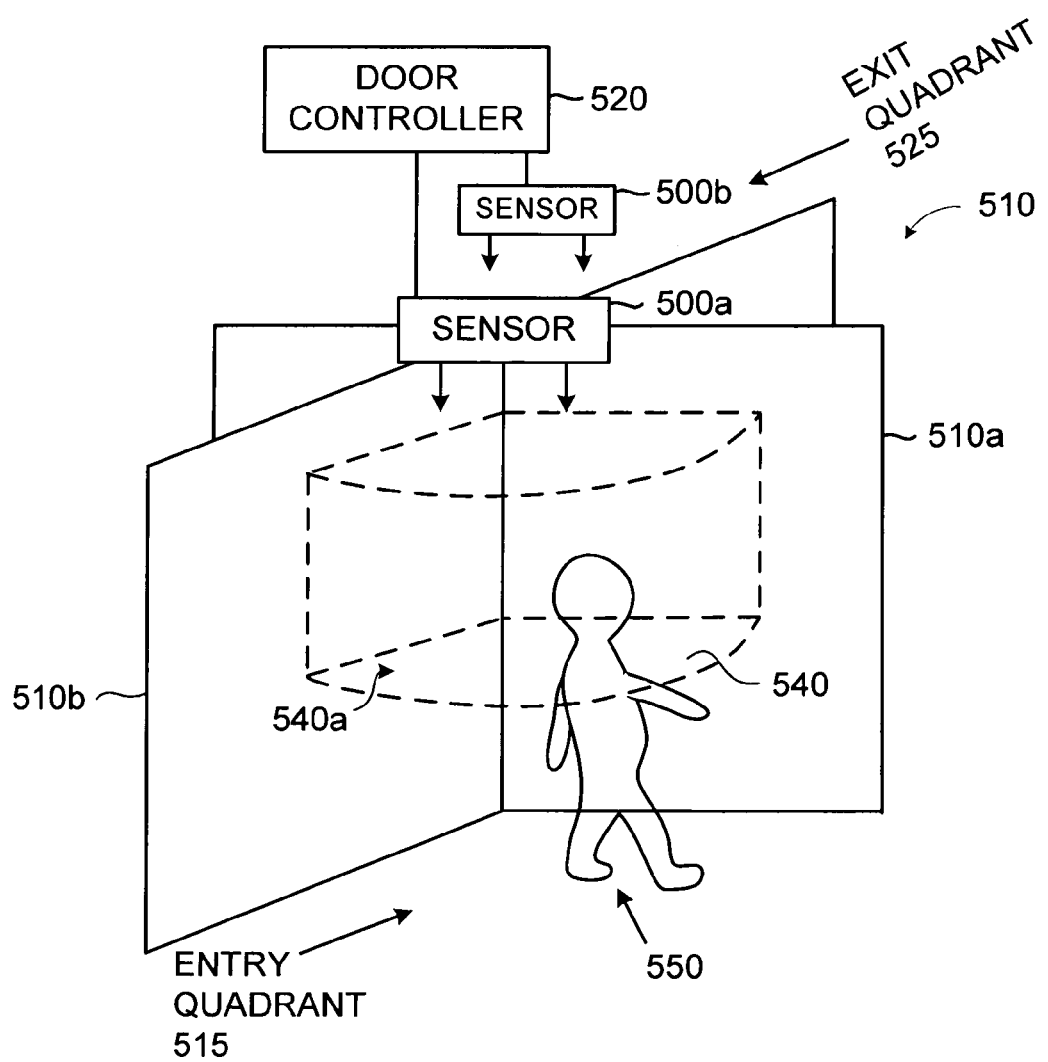
FIG. 7 is a diagram illustrating an application of a stereo door sensor according to one embodiment.

FIG. 7 is a diagram illustrating an application of a stereo door sensor according to one embodiment. In this example, the portal is a revolving door 510. Sensors 500a and 500b are positioned above the revolving door 510 with each independently monitoring a target volume within entry and exit quadrants 515, 525 respectively. For example, sensor 500a can be configured to monitor a target volume 540 having a pie-shaped volume hanging above the floor of entry quadrant 515. To determine the region of interest, 3D features corresponding to a head/shoulder profile of people candidate 550 are detected. The 3D features are then mapped back to a 2D image from which the model was generated. A region of interest is then defined to encompass these pixel values and then used for auto-exposure processing.

Because the revolving door may be installed at a main entrance, the lighting conditions may result in the capture of bright and dark portions within the scene image. Thus, by identifying a region of interest that includes substantially the head and shoulder profile of a people candidate, auto-exposure processing can set the acquisition property settings of the acquisition hardware to provide an optimal linear range for that region and thus sufficient grayscale information for more accurate detection of people candidates.

Figure 8:
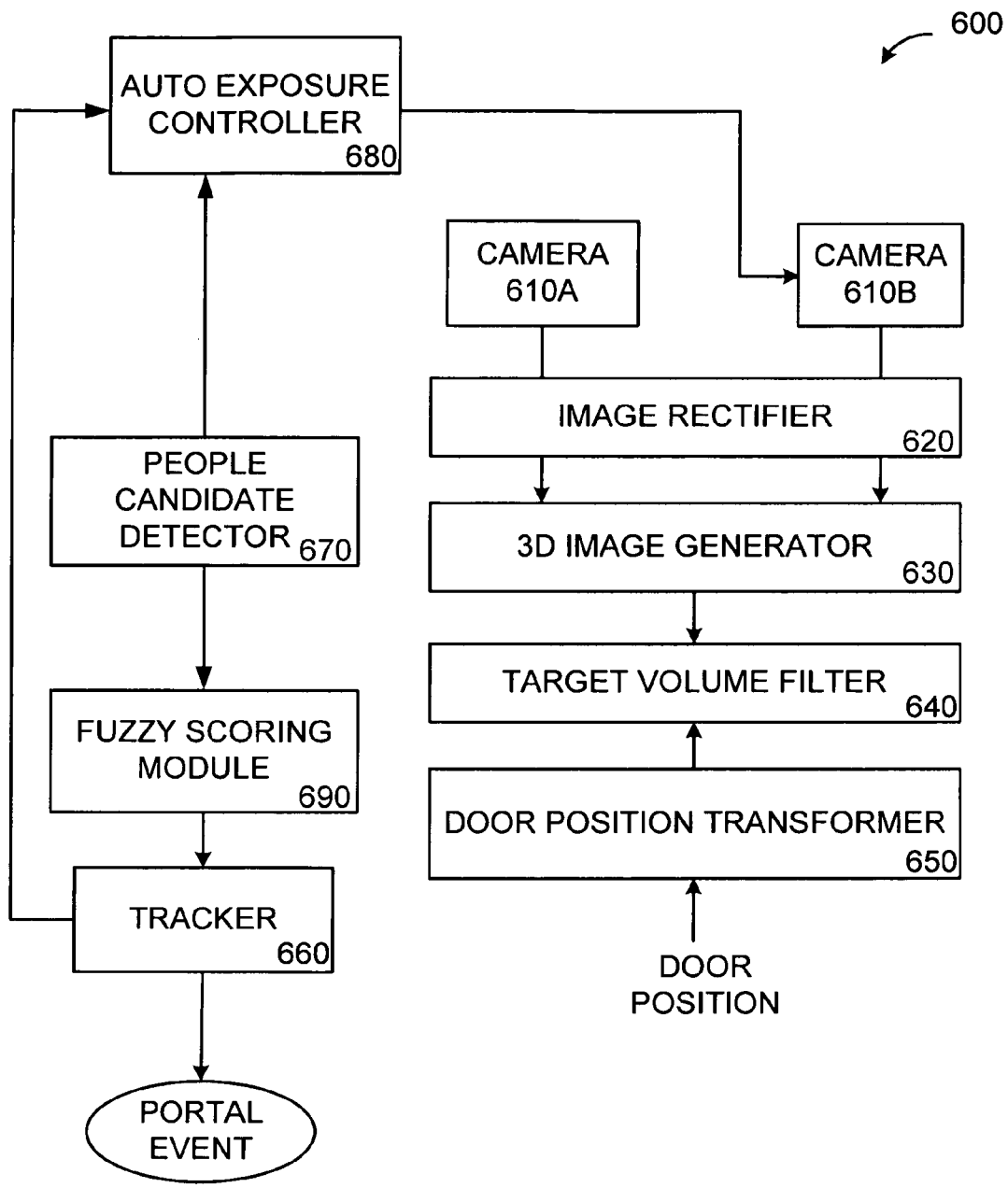
FIG. 8 is a schematic diagram illustrating the components of a stereo door sensor including an auto-exposure controller according to one embodiment.

FIG. 8 is a schematic diagram illustrating the components of a stereo door sensor including an auto-exposure controller according to one embodiment. The sensor 600 includes at least two video cameras 610a, 610b that provide two dimensional images of a scene. The cameras 610a, 610b are positioned such that their lenses are aimed in substantially the same direction.

The sensor 600 preferably includes an image rectifier 620. Ideally, the image planes of the cameras 610a, 610b are coplanar such that a common scene point can be located in a common row, or epipolar line, in both image planes. However, due to differences in camera alignment and lens distortion, the image planes are not ideally coplanar. The image rectifier 620 transforms captured images into rectified coplanar images in order to obtain a virtually ideal image planes. The use of image rectification transforms are well known in the art for coplanar alignment of camera images for stereoscopy applications. Calibration of the image rectification transform is preferably performed during assembly of the sensor.

For information on camera calibration, refer to R. Y. Tsai, "A versatile camera calibration technique for high-accuracy 3D machine vision metrology using off-the-shelf TV cameras and lenses," *IEEE J. Robotics and Automation*, vol. 3, no. 4, pp. 323-344 (hereinafter the "Tsai publication"), the entire contents of which are incorporated herein by reference. Also, refer to Z. Zhang, "A Flexible New Technique for Camera Calibration," *Technical Report MSR-TR*-98-71, MICROSOFT Research, MICROSOFT CORPORATION, pp 1-22 (Mar. 25, 1999) (hereinafter the "Zhang publication"), the entire contents of which are incorporated herein by reference.

A 3D image generator 630 generates 3D models of scenes surrounding a door from pairs of rectified images. In particular, the 3D image generator 630 can generate a three dimensional model in 3D world coordinates such that the model accurately represents the image points in a real 3D space.

A target volume filter 640 receives a 3D model of a door scene and clips all 3D image points outside the target volume. The target volume can be a fixed volume or dynamically variable volume. According to one embodiment, the dynamic target volume depends on a door position, or angle. The door position, or angle, is received by a door position transform 650 that converts the encoder value into a door position (angle) value. This angle value is provided to the target volume filter 640, which rotates the target volume by the phase value. According to another embodiment, the target volume is static volume and an identity transform can be used in place of the door position transform. Any image points within the 3D model that fall within the target volume are forwarded to a people candidate detector 670.

In an another embodiment, the filter 640 may receive the rectified 2D images of the field of view, clip the images so as to limit the field of view, and then the clipped images to the 3D image generator 630 to generate a 3D model that corresponds directly to a target volume.

The people candidate detector 670 can perform multi-resolution 3D processing such that each 3D image point within the target volume is initially processed at low resolution to determine a potential set of people candidates. From that set of people candidates, further processing of the corresponding 3D image points are performed at higher resolution to confirm the initial set of people candidates within the target volume. Some of the candidates identified during low resolution processing may be discarded during high resolution processing.

The positions of the confirmed candidates are then transferred to an auto-exposure controller 680 where the locations of the candidates are used to define one or more regions of interest upon which to perform auto-exposure processing. For example, some applications require ROI's be rectangular and aligned with the pixel grid. For such applications, one can define a ROI to be the bounding box of the pixels corresponding to a 3D feature. Other applications may choose to use morphology operations to alter the shape or size of the area of the pixels corresponding to the extracted features. The auto-exposure controller 680 can then perform traditional auto-exposure techniques using the regions of interest. Alternatively, the controller 680 may use anticipated locations of the confirmed candidates as determined by a tracking algorithm in the tracker 660.

The scoring module 690 is used in a process for determining fuzzy set membership scores, also referred to as confidence scores, that indicate a confidence level that there is zero, one or more people in the target volume.

Field Calibration of 3D World Coordinate System

In order to generate the three dimensional models from the captured two dimensional images, a 3D coordinate system in world coordinates is preferred. With a 3D world coordinate system, objects are transformed in a space relative to the door instead of the camera. For more details regarding a process for calibrating a 3D world coordinate system from a 3D camera coordinate system, refer to U.S. patent application Ser. No. 10/702,059, filed Nov. 5, 2003, entitled "METHOD AND SYSTEM FOR ENHANCED PORTAL SECURITY THROUGH STEREOSCOPY," the entire teachings of the above application are incorporated herein by reference.

Defining a Target Volume

Rather than analyze the entire 3D model of the scene about the portal, a smaller version of the scene, or target volume, can be defined that excludes unnecessary elements from the analysis, such as floors, walls and other area that are not of interest. For more information regarding a technique for defining a target volume, refer to U.S. patent application Ser. No. 10/702,059, filed Nov. 5, 2003, entitled "METHOD AND SYSTEM FOR ENHANCED PORTAL SECURITY THROUGH STEREOSCOPY," the entire teachings of the above application are incorporated herein by reference.

Portal Access Event Detection

Figure 9:
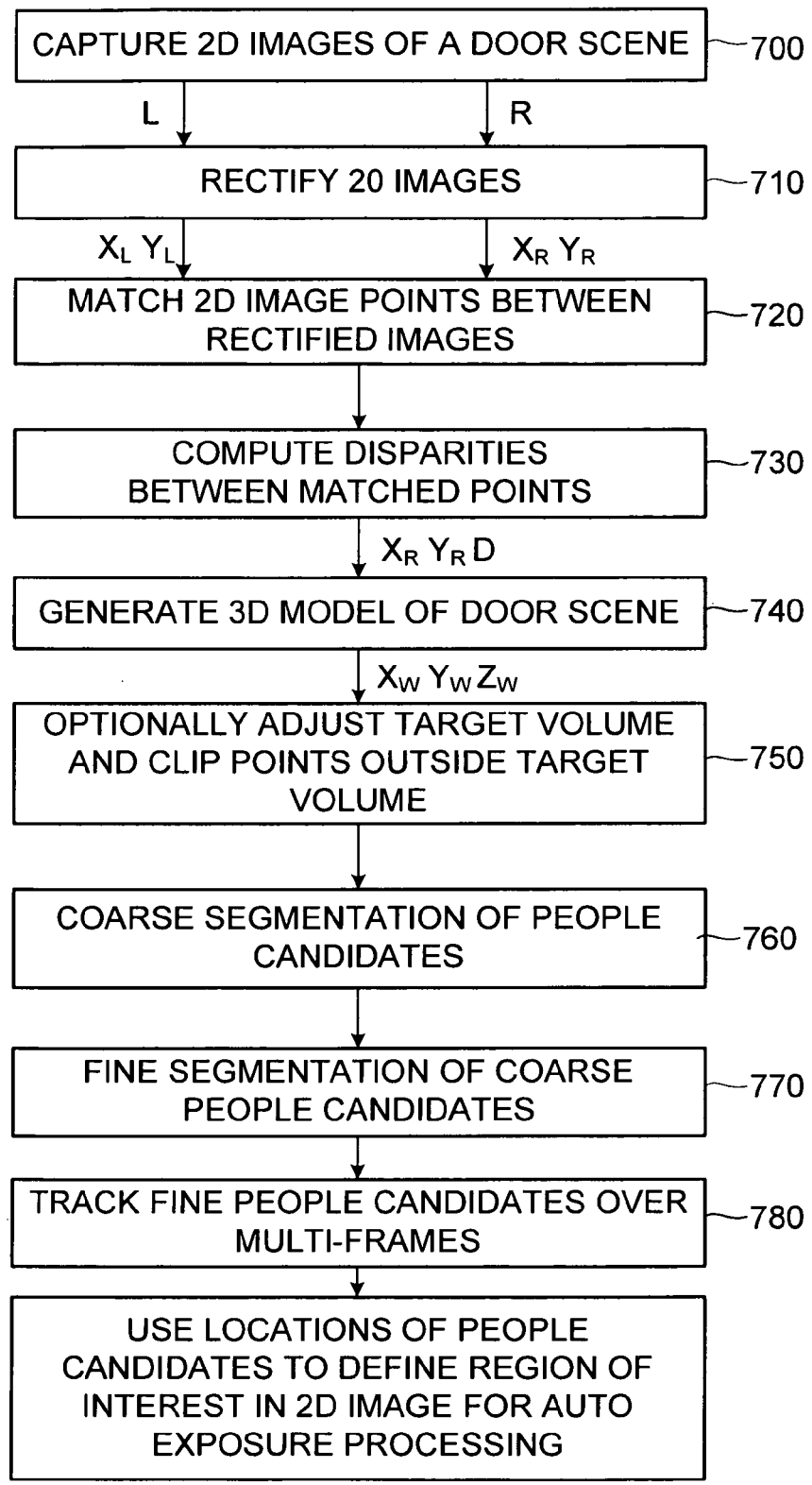
FIG. 9 is a flow diagram illustrating a process for detecting 3D features of people candidates within a model of a portal scene according to one embodiment.

FIG. 9 is a flow diagram illustrating a process for detecting 3D features of people candidates within a model of a portal scene according to one embodiment.

At 700, two dimensional images (e.g. right and left images) of a door scene are captured by cameras 610a, 610b. One of these cameras is designated the reference camera, and an image from the reference camera is the reference image.

At 710, the 2D images from cameras 610a, 610b are rectified by applying an image rectification transform that corrects for alignment and lens distortion, resulting in virtually coplanar images. Rectification can be performed by using standard image rectification transforms known in the art. In a preferred embodiment, the image rectification transform is implemented as a lookup table through which pixels of a raw image are transformed into pixels of a rectified image.

At 720, the 2D image points from the reference image $(X_R, Y_R)$ are matched to corresponding 2D image points in the non-reference image $(X_L, Y_L)$. By rectifying the images, reference image points $(X_R, Y_R)$ are matched to non-reference image points $(X_L, Y_L)$ along the same row, or epipolar line. Matching can be performed through known techniques in the art, such as in T. Kanade et al, "A Stereo Machine for Videorate Dense Depth Mapping and Its New Applications," Proc. IEEE Computer Vision and Pattern Recognition (CVPR), pp. 196-202, (1996), the entire contents of which are incorporated herein by reference.

At 730, a set of disparities D corresponding to the matched image points is computed relative to the reference image points $(X_R, Y_R)$, resulting in a disparity map $(X_R, Y_R, D)$, also called the depth map or the depth image. The disparity map contains a corresponding disparity 'd' for each reference image point $(x_R, y_R)$. By rectifying the images, each disparity 'd' corresponds to a shift in the x-direction.

At 740, a three dimensional model of the door scene is generated in 3D world coordinates. In one embodiment, the three dimensional scene is first generated in 3D camera coordinates $(X_C, Y_C, Z_C)$ from the disparity map $(X_R, Y_R, D)$ and intrinsic parameters of the reference camera geometry. The 3D camera coordinates $(X_C, Y_C, Z_C)$ for each image point are then converted into 3D world coordinates $(X_W, Y_W, Z_W)$ by applying the coordinate system transform.

At 750, the target volume can be dynamically adjusted and image points outside the target volume are clipped. For example, in the case of revolving doors, the target volume is rotated according to a door position. The 3D world coordinates of the door scene $(X_W, Y_W, Z_W)$ that fall outside the 3D world coordinates of target volume are clipped. In a particular embodiment, clipping can be effectively performed by setting the disparity value 'd' to zero for each image points $(x_R, y_R)$ whose corresponding 3D world coordinates fall outside the target volume, resulting in a filtered disparity map "filtered $(X_R, Y_R, D)$". A disparity value that is equal to zero is considered invalid. The filtered disparity map is provided as input to a multi-resolution people segmentation process commencing at 760.

Figure 10A:
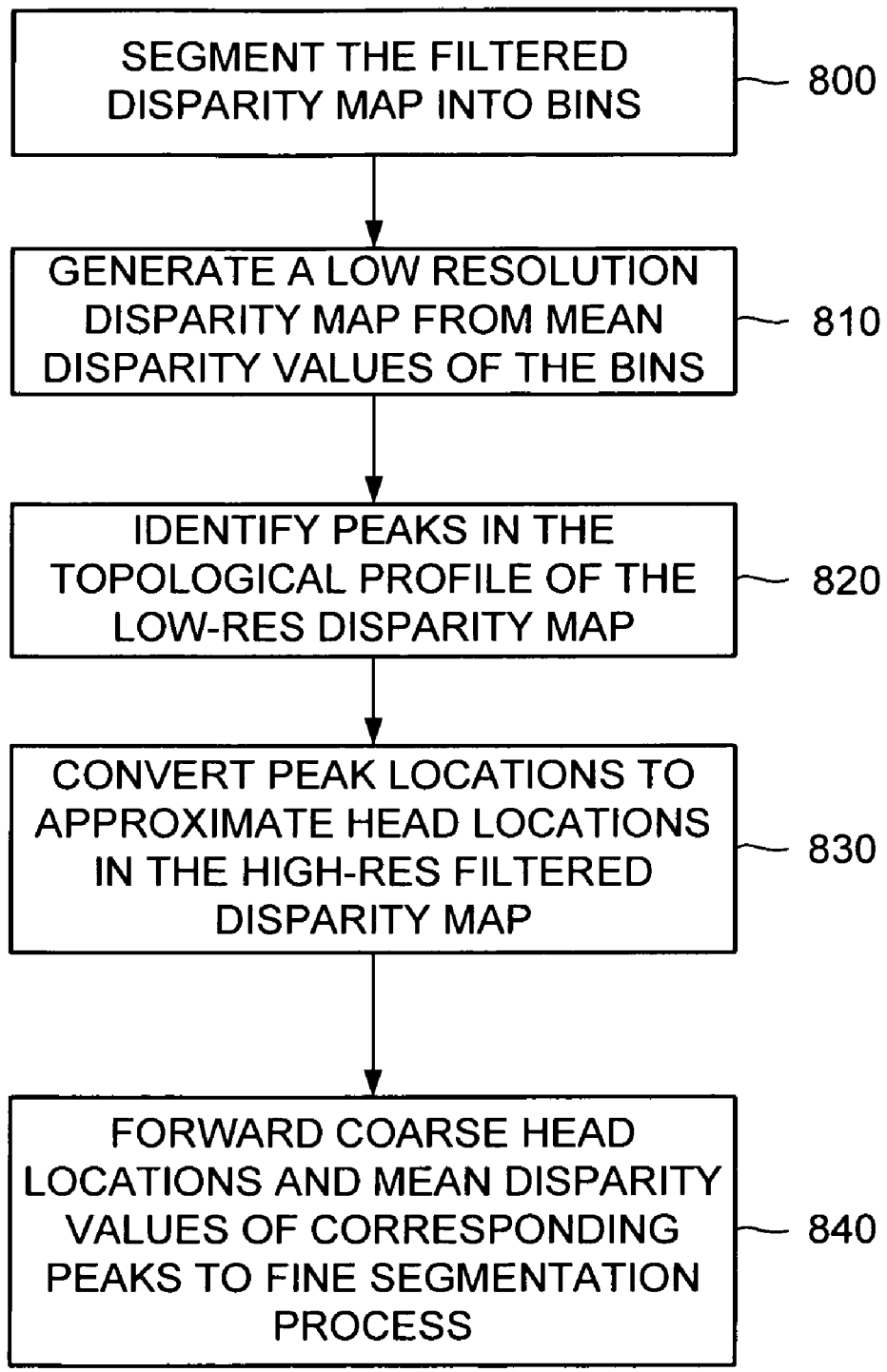
FIGS. 10A and 10B are diagrams illustrating a coarse segmentation process that identifies coarse people candidates according to one embodiment.
Figure 10B:
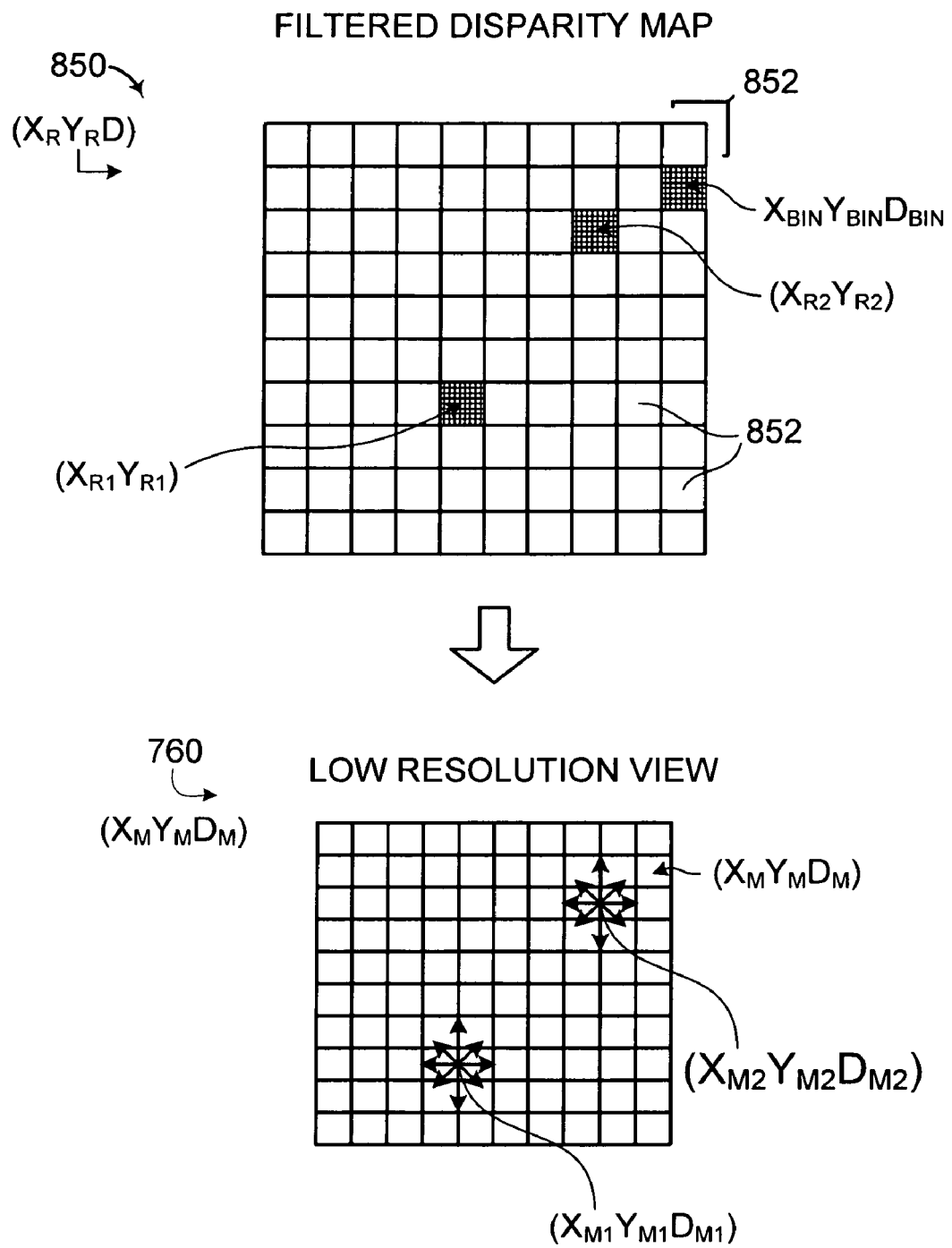

At 760, coarse segmentation is performed for identifying people candidates within the target volume. According to one embodiment, coarse segmentation includes generating a topological profile of the target volume from a low resolution view of the filtered disparity map. Peaks within the topological profile are identified as potential people candidates. A particular embodiment for performing coarse segmentation is illustrated in FIGS. 10A and 10B.

Figure 11A:
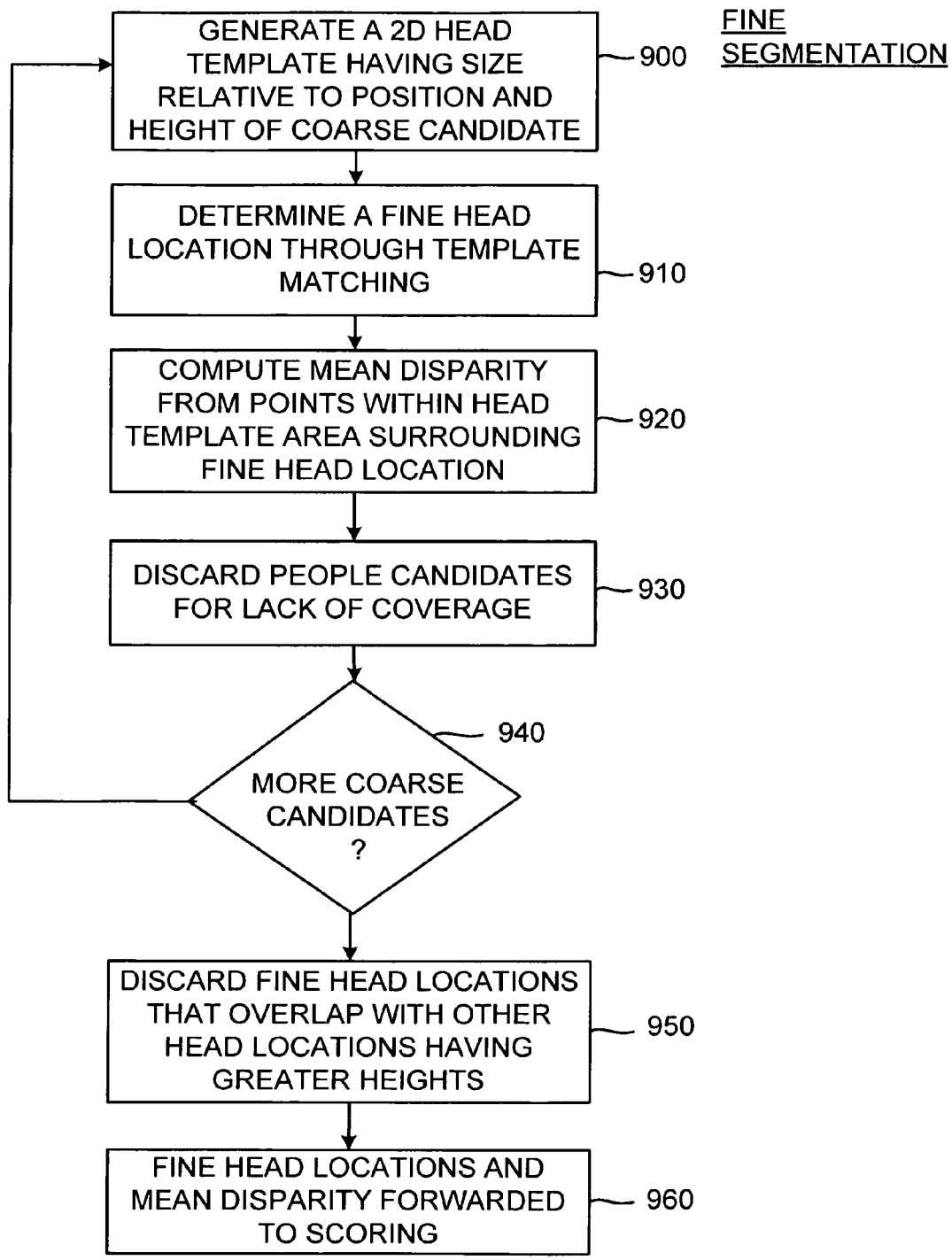
FIGS. 11A, 11B, and 11C are diagrams illustrating a fine segmentation process for validating or discarding coarse people candidates according to one embodiment.
Figure 11B:
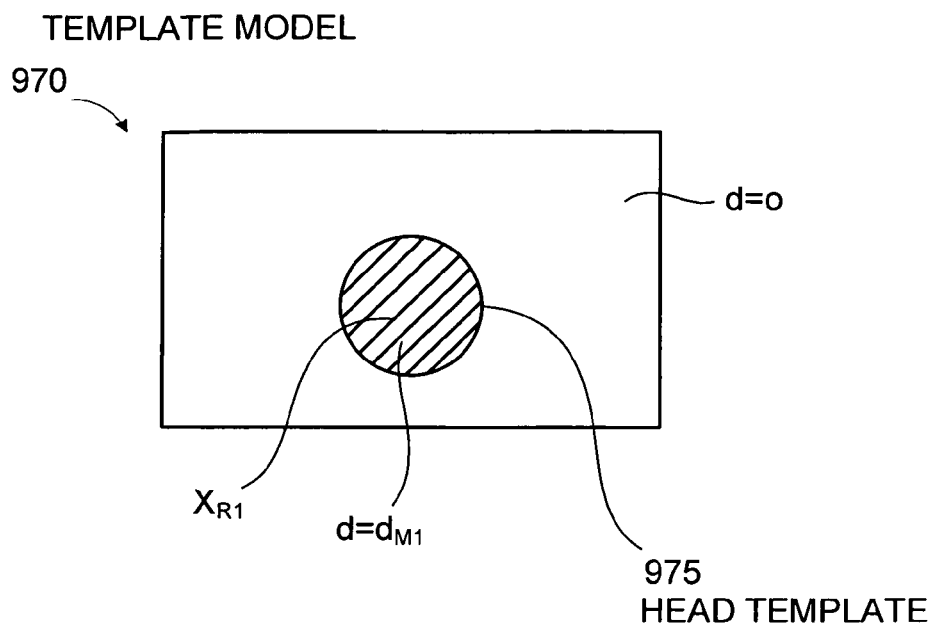
Figure 11C:
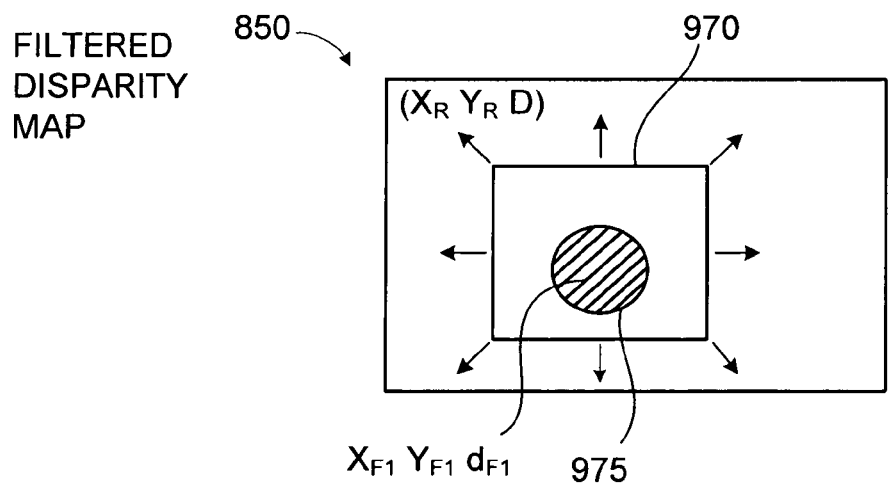

At 770, fine segmentation is performed for confirming or discarding people candidates identified during course segmentation. According to one embodiment, the filtered disparity map is analyzed within localized areas at full resolution. The localized areas correspond to the locations of the people candidates identified during the coarse segmentation process. In particular, the fine segmentation process attempts to detect head and shoulder profiles within three dimensional volumes generated from the localized areas of the disparity map. A particular embodiment for performing fine segmentation is illustrated in FIGS. 11A through 11C.

At 780, the validated people candidates are tracked across multiple frames to determine access events, such as a piggyback violation, a single person event, or an ambiguous event. For example, the validated people candidates can be tracked using a fuzzy/confidence level scoring algorithm over a series of video image frames. The people candidates may also be tracked according to a trajectory tracking algorithm. For more information regarding methods for tracking validated people candidates across multiple image frames, refer to U.S. patent application Ser. No. 10/702,059, filed Nov. 5, 2003, entitled "METHOD AND SYSTEM FOR ENHANCED PORTAL SECURITY THROUGH STEREOSCOPY," the entire teachings of the above application are incorporated herein by reference.

At 790, the locations of the people candidates as determined at either 660, 670 or 680 are then transferred to the auto-exposure controller 680 where the locations are used to define one or more regions of interest upon which to perform auto-exposure processing as described in FIG. 6A. The image acquisition property settings obtained from auto-exposure processing are then applied to the cameras 610a, 610b for subsequent image acquisitions.

Coarse Segmentation of People Candidates

FIGS. 10A and 10B are diagrams illustrating a coarse segmentation process that identifies coarse people candidates according to one embodiment. In particular, FIG. 10A is a flow diagram illustrating a coarse segmentation process that identifies coarse people candidates according to one embodiment. The detected locations of the coarse people candidates resulting from the segmentation process are then forwarded to a fine segmentation process for validation or discard.

At 800, the filtered disparity map is segmented into bins. For example, in FIG. 10B, the filtered disparity map 850 includes points $(X_R, Y_R, D)$ which are segmented into bins 852, such that each bin contains a set of image points $(X_{BIN}, Y_{BIN})$ and their corresponding disparities $(D_{BIN})$.

At 810 of FIG. 10A, a low resolution disparity map is generated from calculated mean disparity values of the bins. For example, in FIG. 10B, a low resolution disparity map 860 is generated including points $(X_M, Y_M, D_M)$ where the points $(X_M, Y_M)$ correspond to bin locations in the high resolution disparity map 850 and $D_M$ corresponds to the mean disparity values $d_M$ calculated from those bins.

In a particular embodiment, a mean disparity value $d_M$ for a particular bin can be calculated by generating a histogram of all of the disparities $D_{BIN}$ in the bin having points ($X_{BIN}$, $Y_{BIN}$). Excluding the bin points in which the disparities are equal to zero and thus invalid, a normalized mean disparity value $d_M$ is calculated. The normalized mean disparity $d_M$ is assigned to a point in the low resolution disparity map for that bin.

At 820 of FIG. 10A, peaks are identified in the topological profile of the low resolution disparity map. In a particular embodiment, a peak is identified at a location in the low resolution disparity map having the largest value for mean disparity value $d_M$.

The extent of the peak is determined by traversing points in every direction, checking the disparity values at each point, and stopping in a direction when the disparity values start to rise. After determining the extent of the first peak, the process repeats for any remaining points in the low resolution map that have not been traversed.

For example, in FIG. 10B, peak locations are identified at ($x_{M1}$, $y_{M1}$) and ($x_{M2}$, $Y_{M2}$) of the low resolution disparity map 860 having mean disparity values $d_{M1}$, $d_{M2}$. The arrows extending from the peak locations illustrate the paths traversed from the peak locations. A watershed algorithm can be implemented for performing the traversal routine.

At 830 of FIG. 10A, each of the peak locations are converted to approximate head location in the high resolution filtered disparity map. For example, in FIG. 10B, peak locations ($x_{M1}$, $y_{M1}$) and ($x_{M2}$, $y_{M2}$) in the low resolution disparity map 860 are converted into locations ($x_{R1}$, $y_{R1}$) and ($x_{R2}$, $y_{R2}$) in the high resolution disparity map 850. This conversion can be accomplished by multiplying the peak locations by the number and size of the bins in the corresponding x- or y-direction.

At 840 of FIG. 10A, the locations of the coarse people candidates (e.g., ($x_{R1}$, $y_{R1}$) and ($x_{R2}$, $y_{R2}$)) in the filtered disparity map and the mean disparity values $d_{M1}$, $d_{M2}$ of the corresponding peak locations are forwarded to a fine segmentation process for validating or discarding these locations as people candidates, as in FIG. 11A.

Fine Segmentation of People Candidates

FIGS. 11A, 11B, and 11C are diagrams illustrating a fine segmentation process for validating or discarding coarse people candidates according to one embodiment. In particular, FIG. 11A is a flow diagram illustrating fine segmentation process for validating or discarding coarse people candidates according to one embodiment. In particular, the fine segmentation process obtains more accurate, or fine, locations of the coarse people candidates in the filtered disparity map and then determines whether the coarse people candidates have the characteristic head/shoulder profiles from localized analysis of the high resolution filtered disparity map. Depending on the results, the fine segmentation process either validates or discards the people candidates.

At 900, a two dimensional head template is generated having a size relative to the disparity of one of the coarse candidates. Disparity corresponds indirectly to height such that as disparity increases, the distance from the camera decreases, and thus the height of the person increases. For example, FIG. 11B is a block diagram of an exemplary head template according to one embodiment. In the illustrated embodiment, the template model 970 includes a head template 975. The head template 975 is a circular model that corresponds to the top view of a head.

The dimensions of the head template 975 are based on the coarse location of the candidate (e.g., $x_{R1}$, $y_{R1}$), the mean disparity value (e.g., $d_{M1}$), and known dimensions of a standard head (e.g. 20 cm in diameter, 10 cm in radius). For example, to compute the dimensions of the head template, the position of the head is computed in 3D world coordinates (X, Y, Z) from the calculated coarse location and a mean disparity value using the factory data (e.g., intrinsic parameters of camera geometry) and field calibration data (e.g., camera to world coordinate system transform). Next, consider another point in the world coordinate system which is (X+10 cm, Y, Z) and compute the position of the point in the rectified image space (e.g., $x_{R1}$, $y_{R2}$) which is the image space in which all the image coordinates are maintained. The length of the vector defined by ($x_{R1}$, $y_{R1}$) and ($x_{R2}$, $y_{R2}$) corresponds to the radius of the circular model for the head template 975.

Furthermore, each point within the area of the resulting head template 975 is assigned the mean disparity value (e.g., $d_{M1}$) determined for that candidate. Points outside the head template 975 are assigned an invalid disparity value equal to zero.

At 910 of FIG. 11A, a fine location for the candidate is determined through template matching. For example, in the illustrated embodiment of FIG. 11C, the template model 970 overlays the filter disparity map 850 at an initial position corresponding to the coarse head location (e.g., $x_{R1}$, $y_{R1}$). The disparities of the filtered disparity map 850 that fall within the head template 975 are then subtracted from the mean disparity value for the coarse people candidate (e.g., $d_{M1}$). A sum of the absolute values of these differences is then computed as a template score that serves as a relative indication of whether the underlying points of the filtered disparity map correspond to a head. Other correlation techniques may also be implemented to generate the template score.

The template matching is repeated, for example, by positioning the template 970 to other areas such that the center of the head template 975 corresponds to locations about the original coarse location of the candidate (e.g., $x_{R1}$, $y_{R1}$). A fine location for the candidate ($x_{F1}$, $y_{F1}$) is obtained from the position of the head template 975 at which the best template score was obtained.

At 920, another mean disparity value $d_{F1}$ is computed from the points of the filtered disparity map within the head template 975 centered at the fine candidate location ($x_{F1}$, $y_{F1}$). In a particular embodiment, the mean disparity value $d_{F1}$ can be calculated by generating a histogram of all the disparities of the filtered disparity map that fall within the head template. Excluding the points in which the disparities are equal to zero and thus invalid, the normalized mean disparity value $d_{F1}$ is calculated.

At 930, people candidates are discarded for lack of coverage by analyzing the disparities that fall within the head template which is fixed at the fine head location. For example, it is known that disparity corresponds to the height of an object. Thus, a histogram of a person's head is expected to have a distribution, or coverage, of disparities that is centered at a particular disparity tapering downward. If the resulting histogram generated at 920 does not conform to such a distribution, it is likely that the candidate is not a person and the candidate is discarded for lack of coverage.

At 940, the process determines whether there are more coarse candidates to process. If so, the process returns to 900 to analyze the next candidate. Otherwise, the process continues at 950.

At 950, people candidates having head locations that overlap with head locations of other people candidates are discarded. In a particular embodiment, the head locations of all of the people candidates are converted from the filtered disparity map into their corresponding 3D world coordinates. People candidates whose head locations overlap with the head locations of other people candidates result in at least one of the candidates being discarded. Preferably, the candidate corresponding to a shorter head location is discarded, because the candidate likely corresponds to a neck, shoulder, or other object other than a person.

At 960, the one or more resulting fine head locations (e.g., $x_{F1}$, $y_{F1}$) of the validated people candidates and the corresponding mean disparity values (e.g., $d_{F1}$) are forwarded for further processing to determine portal access events, such as a piggyback violation or a single person event. The head locations can also be sent to the auto-exposure controller where the locations are used to define one or more regions of interest upon which to perform auto-exposure processing.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of auto-exposure control for image acquisition hardware using three dimensional information, comprising:
    acquiring 2D images of a scene from one or more cameras having an initial image acquisition property setting;
    detecting 3D features of an object of interest from the 2D images;
    defining a region of interest from the 3D features, the region of interest encompassing the entire 3D features and a portion of the 2D images, the portion being adjacent to the 3D features and encompassing the entire border of the 3D features, the region of interest excluding a remainder portion of the images;
    analyzing intensity levels in the region of interest to determine a camera acquisition property setting specific to the region of interest;
    applying the determined acquisition property setting to the one or more cameras; and
    repeating the steps of defining, analyzing and applying as the 3D features are tracked across the 2D images.

2. The method of claim 1 wherein the region of interest includes 3D features that correspond to a head and shoulders profile.

3. The method of claim 1 wherein the initial acquisition property setting and the next acquisition property setting is one or more of a gain control setting, an exposure time setting, an offset setting, a contrast setting, a brightness setting, an illumination setting, a strobe light setting, or a structured lighting setting.

4. The method of claim 1 wherein the one or more cameras is a stereo camera.

5. The method of claim 1 wherein the region of interest includes 3D features that correspond to a profile of a human or other vertebrate body part.

6. A method of auto-exposure control for image acquisition hardware using three dimensional information, comprising:
    acquiring 2D images of a scene about a portal from one or more cameras having an initial acquisition property setting;
    detecting 3D features of an object of interest from the 2D images;
    defining a region of interest from the 3D features, the region of interest encompassing the entire 3D features and a portion of the 2D images, the portion being adjacent to the 3D features and encompassing the entire border of the 3D features, the region of interest excluding a remainder portion of the images;
    analyzing intensity levels in the region of interest to determine a camera acquisition property setting specific to the region of interest;
    applying the determined acquisition property setting to the one or more cameras; and
    repeating the steps of defining, analyzing and applying as the 3D features are tracked across the 2D images.

7. The method of claim 5 wherein the portal is a revolving door, a sliding door, a swinging door, or a man trap.

8. The method of claim 6 wherein the one or more cameras is a stereo camera.

9. The method of claim 6 wherein the region of interest includes 3D features that correspond to a profile of a human or other vertebrate body part.

10. A system of auto-exposure control for image acquisition hardware using three dimensional information, comprising:
    one or more cameras having an initial acquisition property setting, the one or more cameras acquiring 2D images of a scene; and
    a 3D imaging system detecting 3D features of an object of interest from the 2D images and defining a region of interest from the 3D features, the region of interest encompassing the entire 3D features and a portion of the 2D images, the portion being adjacent to the 3D features and encompassing the entire border of the 3D features, the region of interest excluding a remainder portion of the images, the 3D imaging system analyzing the region of interest to determine a camera acquisition property setting specific to the region of interest and applying the determined acquisition property setting to the one or more cameras.

11. The system of claim 10 wherein:
    the 3D imaging system adjusts the location of the region of interest and acquisition property setting as the 3D features are tracked across further 2D images.

12. The system of claim 10 wherein the region of interest includes 3D features that correspond to a head and shoulders profile.

13. The system of claim 10 wherein the initial acquisition property setting and the next acquisition property setting is one or more of a gain control setting, an exposure time setting, an offset setting, a contrast setting, a brightness setting, an illumination setting, a strobe light setting, or a structured lighting setting.

14. The system of claim 10 wherein the one or more cameras is a stereo camera.

15. The system of claim 10 wherein the region of interest includes 3D features that correspond to a profile of a human or other vertebrate body part.

16. A system of auto-exposure control for image acquisition hardware using three dimensional information, comprising:
    one or more cameras having an initial acquisition property setting, the one or more cameras acquiring 2D images of a scene about a portal; and
    a 3D imaging system detecting 3D features of an object of interest from the 2D images and defining a region of interest from the 3D features, the region of interest including the entire 3D features that correspond to a head and shoulders profile and a portion of the 2D images, the portion being adjacent to the 3D features and encompassing the entire border of the 3D features, the region of interest excluding a remainder portion of the images, the 3D imaging system analyzing the region of interest to determine a camera acquisition property setting specific to the region of interest and applying the determined acquisition property setting to the one or more cameras.

17. The system of claim 16 wherein:
the 3D imaging system adjusts the location of the region of interest and acquisition property setting as the head and shoulders profile is tracked across further 2D images.

18. The system of claim 16 wherein the portal is a revolving door, a sliding door, a swinging door, or a man trap.

19. The system of claim 16 wherein the one or more cameras is a stereo camera.

20. The system of claim 16 wherein the region of interest includes 3D features that correspond to a profile of a human or other vertebrate body part.

21. A system of auto-exposure control for image acquisition hardware using three dimensional information, comprising:
one or more cameras having an initial acquisition property setting, the one or more cameras acquiring 2D images of a scene;
means for detecting 3D features of an object of interest from the 2D images and locating a region of interest from the 3D features, the region of interest encompassing the entire 3D features and a portion of the 2D images, the portion being adjacent to the 3D features and encompassing the entire border of the 3D features and excluding a remainder portion of the images;
means for analyzing intensity levels in the region of interest to determine a camera acquisition property setting specific to the region of interest;
means for applying the determined acquisition property setting to the one or more cameras; and
means for repeating the steps of defining, analyzing and applying as the 3D features are tracked across the 2D images.

22. The system of claim 21 wherein the one or more cameras is a stereo camera.

23. The system of claim 21 wherein the region of interest includes 3D features that correspond to a profile of a human or other vertebrate body part.

* * * * *